United States Patent
Nam et al.

(10) Patent No.: US 10,426,307 B2
(45) Date of Patent: Oct. 1, 2019

(54) CLEANER

(71) Applicant: LG ELECTRONICS INC., Seoul (KR)

(72) Inventors: Bohyun Nam, Seoul (KR); Namhee Kim, Seoul (KR); Jinju Kim, Seoul (KR); Hyeonjeong An, Seoul (KR); Jungbae Hwang, Seoul (KR); Philjae Hwang, Seoul (KR); Mantae Hwang, Seoul (KR); Eunji Sung, Seoul (KR); Taekgi Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/051,227

(22) Filed: Jul. 31, 2018

(65) Prior Publication Data

US 2018/0333033 A1 Nov. 22, 2018

Related U.S. Application Data

(63) Continuation of application No. 15/475,533, filed on Mar. 31, 2017.

(30) Foreign Application Priority Data

Mar. 31, 2016 (KR) .......................... 10-2016-0039814
May 16, 2016 (KR) .......................... 10-2016-0059472
(Continued)

(51) Int. Cl.
*A47L 5/22* (2006.01)
*A47L 5/24* (2006.01)
(Continued)

(52) U.S. Cl.
CPC .............. *A47L 9/1675* (2013.01); *A47L 5/22* (2013.01); *A47L 5/24* (2013.01); *A47L 9/106* (2013.01);
(Continued)

(58) Field of Classification Search
CPC .... A47L 9/1625; A47L 9/1633; A47L 9/1641; A47L 9/1666; A47L 9/1675
See application file for complete search history.

(56) References Cited

U.S. PATENT DOCUMENTS 5,062,870 A 11/1991 Dyson et al.
5,205,014 A 4/1993 Yoo
(Continued)

FOREIGN PATENT DOCUMENTS

CA 2917900 9/2010
CN 2920567 Y 7/2007
(Continued)

OTHER PUBLICATIONS

International Search Report in International Application No. PCT/KR2017/003587, dated Jun. 29, 2017, 3 pages (with partial English translation).
(Continued)

*Primary Examiner* — Andrew A Horton
(74) *Attorney, Agent, or Firm* — Fish & Richardson P.C.

(57) ABSTRACT

A cleaner includes: a suction motor that generates suction force; a dust separation unit that separates dust from air sucked by the suction force; a motor housing that covers the suction motor; a flow guide that surrounds an outer side of the motor housing and guides air discharged from the dust separation unit to the suction motor; and a body that forms an external appearance by surrounding the flow guide and guides air discharged from the suction motor together with the flow guide.

30 Claims, 28 Drawing Sheets

(30) Foreign Application Priority Data

Jun. 7, 2016 (KR) ........................ 10-2016-0070220
Aug. 25, 2016 (KR) ........................ 10-2016-0108313

(51) Int. Cl.

| A47L 9/10 | (2006.01) |
| --- | --- |
| A47L 9/12 | (2006.01) |
| A47L 9/16 | (2006.01) |
| A47L 9/22 | (2006.01) |
| A47L 9/28 | (2006.01) |
| A47L 9/32 | (2006.01) |

(52) U.S. Cl.

CPC ............... *A47L 9/12* (2013.01); *A47L 9/16* (2013.01); *A47L 9/1625* (2013.01); *A47L 9/1633* (2013.01); *A47L 9/1641* (2013.01); *A47L 9/1683* (2013.01); *A47L 9/22* (2013.01); *A47L 9/28* (2013.01); *A47L 9/2857* (2013.01); *A47L 9/2873* (2013.01); *A47L 9/2884* (2013.01); *A47L 9/32* (2013.01)

(56) References Cited

U.S. PATENT DOCUMENTS

| | | | |
| --- | --- | --- | --- |
| 5,267,371 | A | 12/1993 | Soler et al. |
| 6,113,663 | A | 9/2000 | Liu |
| 6,782,585 | B1 | 8/2004 | Conrad et al. |
| 8,146,201 | B2 | 4/2012 | Conrad |
| 8,308,832 | B2 | 11/2012 | Yoo |
| 8,486,170 | B2 | 7/2013 | Conrad et al. |
| 8,925,145 | B2 | 1/2015 | Wilson |
| 9,005,325 | B2 | 4/2015 | Smth |
| 9,089,248 | B2 | 7/2015 | Yoo |
| 9,655,489 | B2 | 5/2017 | Ha et al. |
| 9,826,868 | B2 | 11/2017 | Conrad |
| 2001/0027585 | A1 | 10/2001 | Lee |
| 2004/0163201 | A1 | 8/2004 | Murphy et al. |
| 2005/0081321 | A1 | 4/2005 | Milligan et al. |
| 2006/0254226 | A1 | 11/2006 | Jeon |
| 2007/0144116 | A1 | 6/2007 | Hong et al. |
| 2009/0245958 | A1 | 10/2009 | Lau et al. |
| 2010/0192314 | A1 | 8/2010 | Otsuka et al. |
| 2010/0209271 | A1 | 8/2010 | Yoo |
| 2010/0251507 | A1 | 10/2010 | Conrad et al. |
| 2013/0091655 | A1 | 4/2013 | Smith |
| 2013/0091661 | A1 | 4/2013 | Smith |
| 2013/0091813 | A1 | 4/2013 | Smith |
| 2013/0091814 | A1* | 4/2013 | Smith .................. A47L 9/1633 55/345 |
| 2013/0192020 | A1 | 8/2013 | Kang |
| 2013/0205538 | A1 | 8/2013 | Thompson |
| 2013/0207615 | A1 | 8/2013 | Sunderland et al. |
| 2014/0020205 | A1 | 1/2014 | Makarov |
| 2014/0137363 | A1 | 5/2014 | Wilson |
| 2014/0325789 | A1 | 11/2014 | Hill et al. |
| 2014/0366495 | A1 | 12/2014 | Stickney et al. |
| 2015/0093973 | A1 | 4/2015 | Sergyeyenko et al. |
| 2015/0143659 | A1 | 5/2015 | Pilch |
| 2015/0320284 | A1 | 11/2015 | Ha et al. |
| 2016/0287043 | A1 | 10/2016 | Ha et al. |
| 2017/0280950 | A1 | 10/2017 | Nam et al. |
| 2017/0280951 | A1 | 10/2017 | Nam et al. |
| 2017/0280952 | A1 | 10/2017 | Nam et al. |
| 2017/0296007 | A1 | 10/2017 | Warren et al. |
| 2017/0332860 | A1 | 11/2017 | Nam et al. |
| 2018/0333022 | A1 | 11/2018 | Nam et al. |
| 2018/0333023 | A1 | 11/2018 | Nam et al. |
| 2018/0333024 | A1 | 11/2018 | Nam et al. |
| 2018/0333025 | A1 | 11/2018 | Nam et al. |
| 2018/0333026 | A1 | 11/2018 | Nam et al. |
| 2018/0333029 | A1 | 11/2018 | Nam et al. |
| 2018/0333030 | A1 | 11/2018 | Nam et al. |
| 2018/0333031 | A1 | 11/2018 | Nam et al. |
| 2018/0333032 | A1 | 11/2018 | Nam et al. |

FOREIGN PATENT DOCUMENTS

| | | |
| --- | --- | --- |
| CN | 101508105 A | 8/2009 |
| CN | 102452069 A | 5/2012 |
| CN | 103784081 A | 5/2014 |
| CN | 104172986 | 12/2014 |
| CN | 104822301 A | 8/2015 |
| CN | 204654807 U | 9/2015 |
| CN | 303387623 S | 9/2015 |
| CN | 207384196 U | 5/2018 |
| CN | 207384197 U | 5/2018 |
| CN | 207384198 U | 5/2018 |
| EP | 0557096 | 8/1993 |
| EP | 0650690 | 5/1995 |
| EP | 1803381 | 7/2007 |
| EP | 1955630 A2 | 8/2008 |
| EP | 2581017 A1 | 4/2013 |
| GB | 2475312 A | 5/2011 |
| JP | H11099097 | 4/1999 |
| JP | 2011143209 | 7/2011 |
| JP | 2012-120582 A | 6/2012 |
| JP | 2013000137 | 1/2013 |
| JP | 2013-106842 A | 6/2013 |
| JP | 2013106842 | 6/2013 |
| JP | 2014176567 | 9/2014 |
| JP | 2014176567 A | 9/2014 |
| JP | 2015034514 | 2/2015 |
| JP | 2015034514 A | 2/2015 |
| JP | 2015119878 | 7/2015 |
| KR | 20-0291206 Y1 | 10/2002 |
| KR | 200291206 | 10/2002 |
| KR | 1020040040092 | 5/2004 |
| KR | 100474807 | 2/2005 |
| KR | 100555862 | 3/2006 |
| KR | 1020060074617 | 7/2006 |
| KR | 100671891 | 1/2007 |
| KR | 10-1127088 B | 4/2008 |
| KR | 10-1262385 B | 8/2008 |
| KR | 10-0640830 B1 | 11/2008 |
| KR | 101127088 | 4/2009 |
| KR | 10-1606890 B1 | 8/2010 |
| KR | 1020110122699 | 11/2011 |
| KR | 1020110132193 | 12/2011 |
| KR | 10-2014-0127305 A | 11/2014 |
| KR | 1020140127305 | 11/2014 |
| KR | 10-2015-0082575 A | 7/2015 |
| KR | 101539020 | 7/2015 |
| KR | 1020150082575 | 7/2015 |
| KR | 10-2015-0128425 A | 11/2015 |
| KR | 10-2015-0133815 A | 11/2015 |
| KR | 1020150133815 | 11/2015 |
| KR | 10-2016-0034041 A | 3/2016 |
| KR | 101606890 | 3/2016 |
| WO | WO2013077122 | 5/2013 |
| WO | WO 2015/068817 A1 | 5/2015 |
| WO | WO 2016/054538 A1 | 4/2016 |
| WO | WO 2017/150861 A1 | 9/2017 |
| WO | WO2017181484 | 10/2017 |

OTHER PUBLICATIONS

International Search Report in International Application No. PCT/KR2017/003588, dated Jun. 29, 2017, 3 pages (with partial English translation).
Office Action in Australian Patent No. 2018100966, dated Sep. 14, 2018, 5 pages.
Office Action in Australian Patent No. 2018100968, dated Sep. 7, 2018, 5 pages.
Office Action in Australian Patent No. 2018100969, dated Sep. 7, 2018, 5 pages.
Office Action in Australian Patent No. 2018100970, dated Sep. 13, 2018, 5 pages.
Office Action in Australian Patent No. 2018100967, dated Sep. 7, 2018, 6 pages.
Office Action in Australian Patent No. 2018100971, dated Sep. 7, 2018, 5 pages.
Office Action in Australian Patent No. 2018100972, dated Sep. 13, 2018, 5 pages.

(56) References Cited

OTHER PUBLICATIONS

Office Action in Australian Patent No. 2018100947, dated Sep. 14, 2018, 5 pages.
Office Action in Australian Patent No. 2018100950, dated Sep. 14, 2018, 5 pages.
Office Action in Australian Patent No. 2018100953, dated Sep. 14, 2018, 5 pages.
Office Action in Australian Patent No. 2018100945, dated Sep. 17, 2018, 6 pages.
Office Action in Australian Patent No. 2018100954, dated Sep. 17, 2018, 6 pages.
Office Action in Australian Patent No. 2018100948, dated Oct. 17, 2018, 5 pages.
Office Action in Australian Patent No. 2018100949, dated Oct. 17, 2018, 5 pages.
United States Office Action in U.S. Appl. No. 15/475,460, dated Apr. 23, 2019, 26 pages.
United States Office Action in U.S. Appl. No. 15/475,550, dated May 3, 2019, 26 pages.
Office Action in U.S. Appl. No. 15/475,476, dated Jan. 14, 2019, 9 pages.
Office Action in U.S. Appl. No. 16/050,852, dated Jan. 11, 2019, 28 pages.
Office Action in U.S. Appl. No. 16/050,883, dated Jan. 4, 2019, 16 pages.
Office Action in U.S. Appl. No. 16/050,945, dated Dec. 28, 2018, 22 pages.
Office Action in U.S. Appl. No. 16/050,956, dated Dec. 28, 2018, 20 pages.
Office Action in U.S. Appl. No. 16/051,072, dated Dec. 27, 2018, 16 pages.
Russian Office Action in Russian Application No. 2018138167/12(063476), dated Apr. 19, 2019, 8 pages.
Japanese Office Action in Japanese Application No. 2018-539344, dated Jul. 23, 2019, 6 pages.
Korean Notice of Allowance in Korean Application No. 10-2018-0074685, dated Jul. 29, 2019, 2 pages.
Extended European Search Report in European Application No. 17775923.0, dated Jul. 31, 2019, 7 pages.

\* cited by examiner

CLEANER

CROSS-REFERENCE TO RELATED APPLICATIONS

This application is a continuation of U.S. application Ser. No. 15/475,533, filed on Mar. 31, 2017, which claims priority under 35 U.S.C. § 119 to Korean Patent Application No. 10-2016-0039814, filed in Korea on Mar. 31, 2016, Korean Patent Application No. 10-2016-0059472, filed in Korea on May 16, 2016, Korean Patent Application No. 10-2016-0070220, filed in Korea on Jun. 7, 2016, and Korean Patent Application No. 10-2016-0108313, filed in Korea on Aug. 25, 2016, whose entire disclosure is hereby incorporated by reference.

BACKGROUND

The present disclosure relates to a cleaner.

Cleaners may be classified into a manual cleaner that a user moves in person for cleaning and an automatic cleaner that automatically moves for cleaning.

Manual cleaners may fall into, depending on the types, a canister cleaner, an upright cleaner, a handy cleaner, and a stick cleaner.

Meanwhile, in the related art, a handheld vacuum cleaner has been disclosed in Korean Patent No. 10-1127088 (registered on 8 Mar. 2012).

The handheld vacuum cleaner includes a suction pipe, an airflow generator, a cyclone, a power supply, and a handle.

Further, the airflow generator is disposed in a motor housing and has an assembly of a motor and a fan. Further, a pre motor filter is disposed ahead of the motor and a post motor filter is disposed behind the motor.

When the filters are used for a long period of time, dust may accumulated in the filters, when the filters are not cleaned, the dust accumulating in the filters acts as flow resistance, thereby deteriorating suction ability.

However, in the document, since the pre motor filter is disposed between the airflow generator, the cyclone and surrounded by a housing at the outside, and it is required to disassemble the product in order to reach the filters, it is troublesome to a user.

Further, the structure for guiding air discharged from the cyclone to the motor and the structure for guiding air that has passed through the motor to the post motor filter are separately provided, so the number of part is large and the structure is complicated.

SUMMARY

The present disclosure provides a cleaner that has a simple structure and includes a small number of parts because one flow guide forms a suction passage and an exhaust passage for a suction motor.

The present disclosure provides a cleaner that is compact and has a sufficient air passage width for a suction motor.

The present disclosure provides a cleaner of which the body that forms the external appearance is not deformed.

The present disclosure provides a cleaner in which a filter unit and pre-filter can be separated.

A cleaner includes: a suction motor that generates suction force; a dust separation unit that separates dust from air sucked by the suction force; a motor housing that covers the suction motor; a flow guide that surrounds the outer side of the motor housing and guides air discharged from the dust separation unit to the suction motor; and a body that forms external appearance by surrounding the flow guide and guides air discharged from the suction motor in cooperation with the flow guide.

A cleaner includes: a suction unit including a longitudinal axis; a suction motor that generates suction force to introduce air through the suction unit; a dust separation unit disposed under the suction motor to separate dust from air sucked by the suction force; one or more air exits disposed above the suction motor in a stated in which the longitudinal axis of the suction unit is horizontally positioned; and an flow guide that guides air separated in the dust separation unit upward to the suction motor and guides the air passing through the suction motor upward to the one or more air exits.

DETAILED DESCRIPTION OF THE EMBODIMENTS

Figure 1:
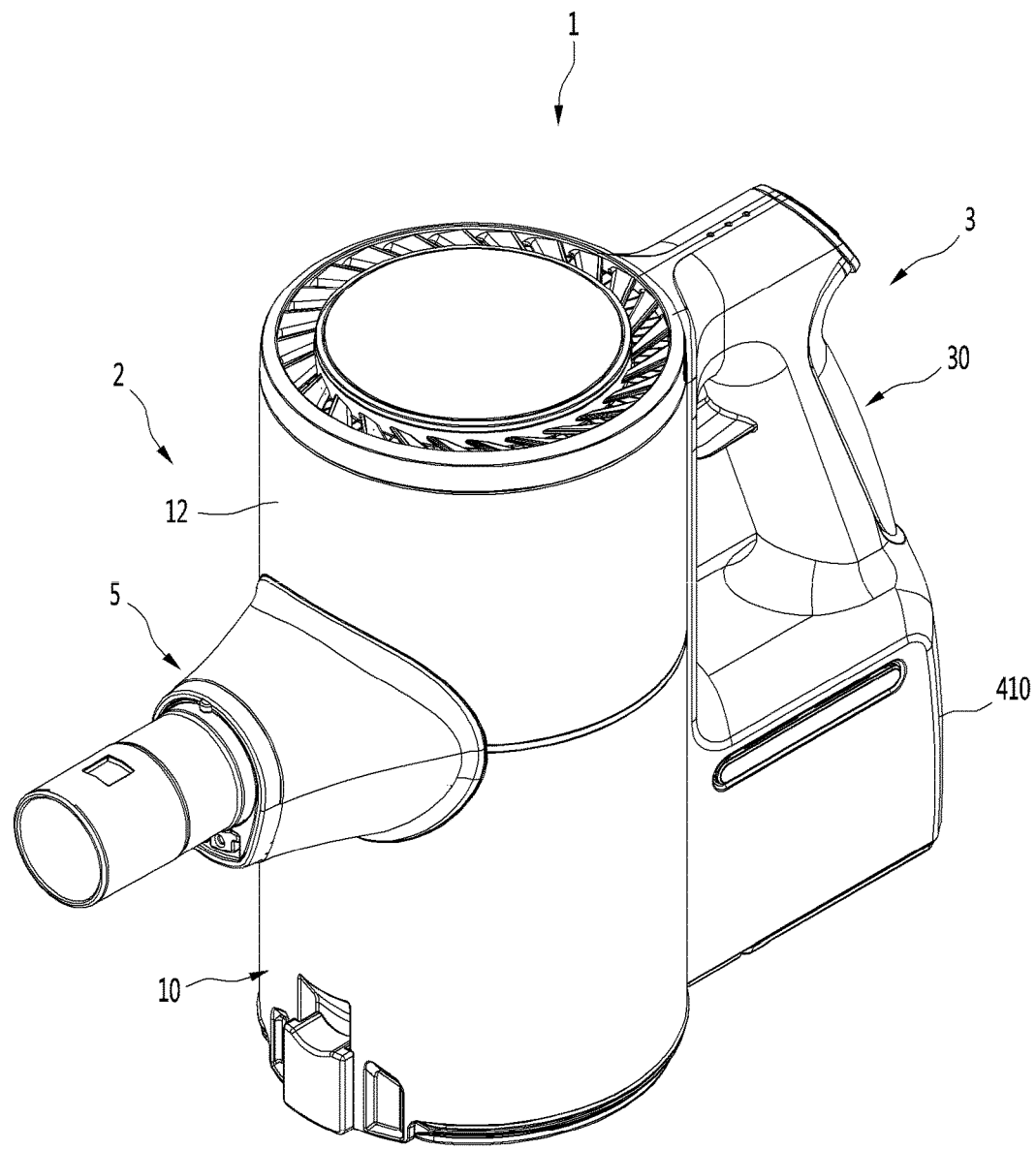
FIG. 1 is a perspective view of a cleaner according to an embodiment of the present invention.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
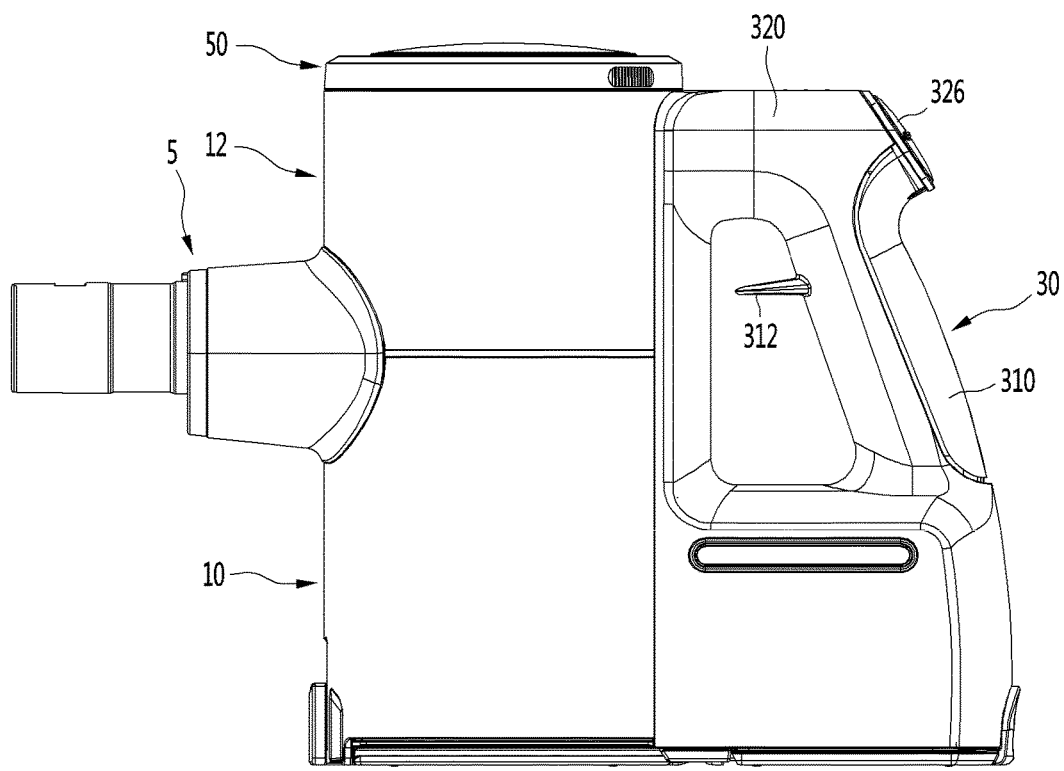
FIG. 2 is a side view of the cleaner according to an embodiment of the present invention.
Figure 3:
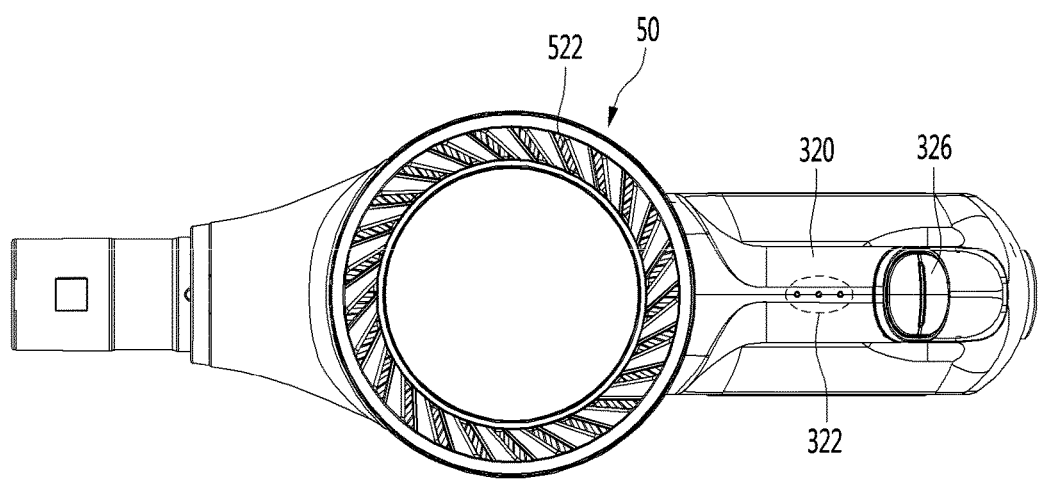
FIG. 3 is a plan view of the cleaner according to an embodiment of the present invention.

FIG. 1 is a perspective view of a cleaner according to an embodiment of the present invention, FIG. 2 is a side view of the cleaner according to an embodiment of the present invention, FIG. 3 is a plan view of the cleaner according to an embodiment of the present invention.

Figure 4:
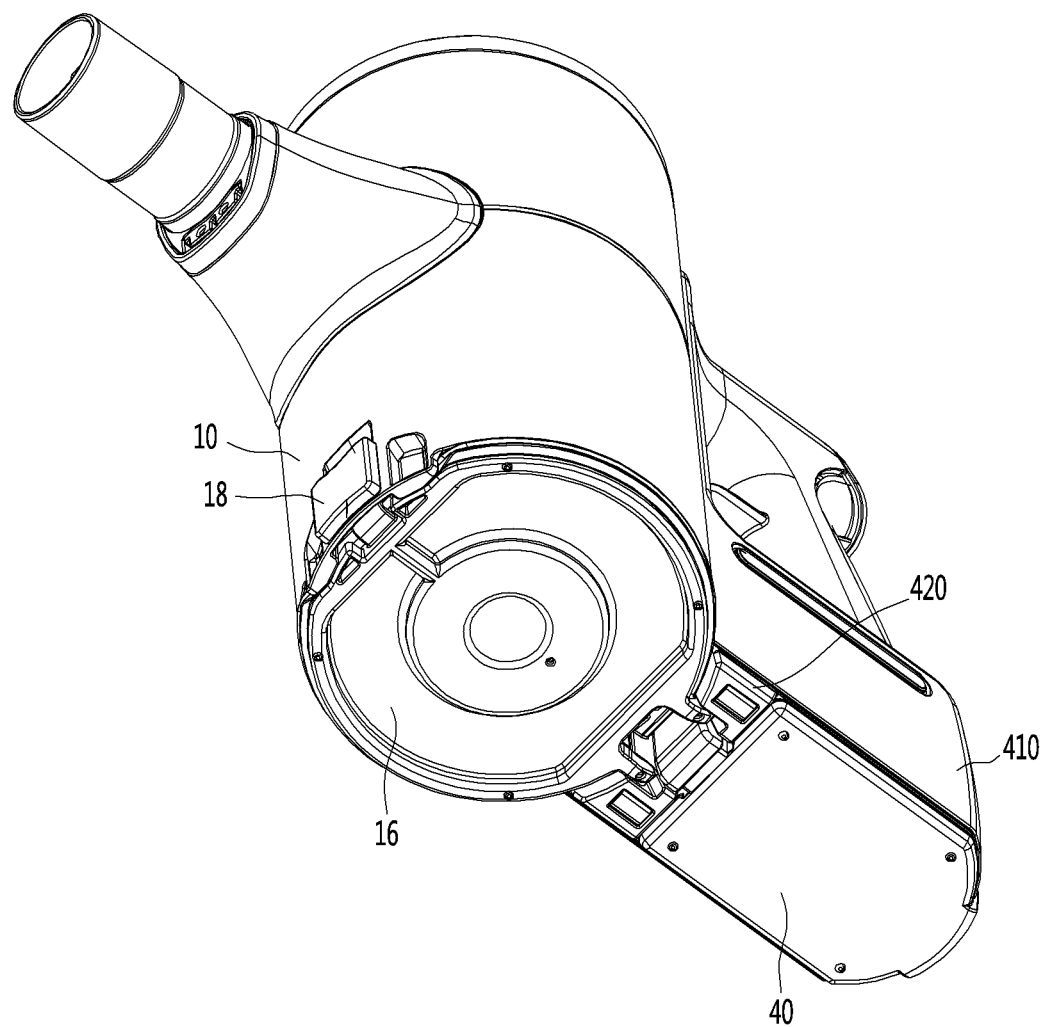
FIG. 4 is a perspective view of the cleaner according to an embodiment of the present invention when seen from under the cleaner.
Figure 5:
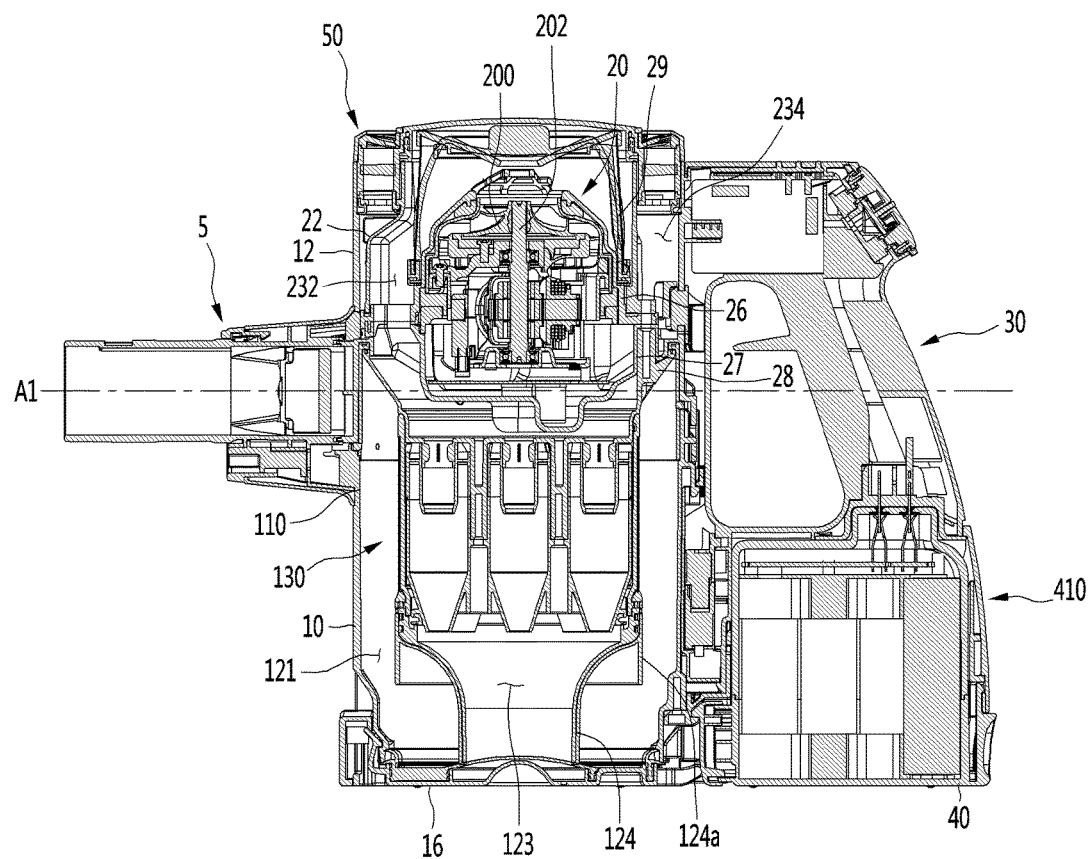
FIG. 5 is a vertical cross-sectional view of the cleaner according to an embodiment of the present invention.

FIG. 4 is a vertical cross-sectional view of the cleaner according to an embodiment of the present invention and FIG. 5 is a horizontal cross-sectional view of the cleaner according to an embodiment of the present invention.

Referring to FIGS. 1 to 5, a cleaner 1 according to an embodiment of the present invention may include a main body 2.

The main body 2 may include a suction unit 5 that sucks air containing dust.

The cleaner 1 may further include a suction unit 5 coupled to the front of the main body 2. The suction unit 5 can guide air containing dust into the main body 2.

The cleaner 1 may further include a handle unit 3 coupled to the main body 2. The handle unit 3 may be positioned opposite to the suction unit 5 on the main body 2.

That is, the main body 2 may be disposed between the suction unit 5 and the handle unit 3.

The main body 2 may include a first body 10 and a second body 12 on the first body 10.

The first body 10 and the second body 12 may be, though not limited thereto, formed in a cylindrical shape.

The suction unit 5 may be coupled to the main body 2 such that the center of the suction unit 5 is positioned approximately at the boundary between the first body 10 and the second body 12.

The main body 2 may further include a dust separation unit that separates dust from air sucked through the suction unit 5.

The dust separation unit 10 may include a first cyclone unit 110 that can separate dust, for example, using cyclonic flow. The first body 10 includes the first cyclone unit 180 in this configuration.

The air and dust sucked through the suction unit 5 helically flow along the inner side of the first cyclone unit 180.

The axis of the cyclonic flow in the first cyclone unit 180 may vertically extend.

The dust separation unit may further include a second cyclone unit 190 that secondarily separates dust from the air discharged out of the first cyclone unit 180. The second cyclone unit 190 may be disposed inside the first cyclone unit 180 to minimize the size of the dust separation unit. The second cyclone unit 190 may include a plurality of cyclone bodies arranged in a raw.

As another example, the dust separation unit may include one cyclone unit, in which the axis of the cyclonic flow may also vertically extend.

The first body 10 functions as a dust container that stores dust separated by the cyclone units 180 and 190. That is, the first body 10 includes the first cyclone unit 180 and the dust container. The upper part of the first body 10 is the first cyclone unit 180 and the lower part of the first body 10 is the dust container. The first body 10 may be partially or entirely transparent or translucent to enable a user to visually check the amount of dust in the dust container.

The main body 2 may further include a body cover 16 for opening/closing the bottom of the first body 10. The body cover 16 can open/close the first body 10 by being rotated.

At least a portion of the second cyclone unit 190 may be positioned inside the first body 10.

A dust storage guide 124 that guides the dust separated by the second cyclone unit 130 to be stored may be disposed in the first body 10. The dust storage guide 124 may be coupled to the bottom of the second cyclone unit 130 in contact with the top of the body cover 16.

The dust storage guide 124 may divide the internal space of the first body 10 into a first dust storage part 121 where the dust separated by the first cyclone unit 180 is stored and a second dust storage part 123 where the dust separated by the second cyclone unit 130 is stored.

The internal space of the dust storage guide 124 is the second dust storage part 123 and the space between the dust storage guide 124 and the first body 10 is the first dust storage part 121.

The dust storage guide 124 of this embodiment may at least partially taper downward. For example, a portion of the upper portion of the dust storage guide 124 may taper downward.

Further, the dust storage guide 124 may have an anti-flying rib 124a extending downward from the upper end of the dust storage guide 124. The anti-flying rib 124a may be formed, for example, in a cylindrical shape and may surround the upper portion of the dust storage guide 124.

Since the upper portion of the dust storage guide 124 tapers downward, a space is defined between the outer side of the upper portion of the dust storage guide 124 and the anti-flying rib 124a.

As described in the previous embodiment, the cyclonic flow generated along the inner side of the second body 10 may move down. When the cyclonic flow comes in contact with the body cover 16 while moving down, the rotating flow can be changed into rising flow by the body cover 16. If there is rising flow in the first dust storage part 121, the dust in the first dust storage part 121 flies upward and flows backward into the second cyclone unit 130.

According to the present invention, rising flow in the first dust storage part 121 is changed into falling flow by the anti-flying rib 124a in the space between the anti-flying rib 124a and the upper portion of the dust storage guide 124, so the dust in the first dust storage part 121 does not fly upward and accordingly it does not flow backward into the second cyclone unit 130.

Further, since the rib 124a extends downward from the upper end of the dust storage guide 124, the dust separated by the cyclonic flow in the first cyclone unit 110 can be smoothly sent into the first dust storage part 121 by the anti-flying rib 124a.

The body cover 16 can open/close both of the first dust storage part 121 and the second dust storage part 123.

The cleaner 1 may further include a suction motor 20 for generating suction force and a battery 40 for supplying power to the suction motor 20.

The suction motor 20 may be disposed in the second body 12. At least a portion of the suction motor 20 may be disposed over the dust separation unit. Accordingly, the suction motor 20 is disposed over the first body 10.

The suction motor 20 may communicate with an outlet of the second cyclone unit 190.

To this end, the main body 2 may further include a discharge guide 28 connected to the second cyclone unit 190 and a flow guide 22 that communicates with the discharge guide 28.

For example, the discharge guide 28 is disposed on the second cyclone unit 190 and the flow guide 22 is disposed over the discharge guide 28.

Further, at least a portion of the suction motor 20 is positioned inside the flow guide 22.

Accordingly, the axis of the cyclonic flow in the first cyclone unit 180 may pass through the suction motor 20.

When the suction motor 20 is disposed over the second cyclone unit 190, the air discharged from the second cyclone unit 190 can flow directly to the suction motor 20, so the passage between the dust separation unit and the suction motor 20 can be minimized.

The suction motor 20 may include a rotary impeller 200. The impeller 200 may be fitted on a shaft 202. The shaft 202 is vertically disposed.

The suction motor 20 may be disposed such that the impeller 200 is positioned at an upper portion in the suction motor 20. According to this configuration, air can be blown downward in the suction motor 20 by the impeller 200.

An extension line from the shaft 202 (which may be considered as the rotational axis of the impeller 200) may pass through the first body 10. The rotational axis of the impeller 200 and the axis of the cyclonic flow in the first cyclone unit 180 may be on the same line.

According to the present invention, there is the advantage that the path through which the air discharged from the dust separation unit, that is, the air discharged upward from the second cyclone unit 190 flows to the suction motor 20 can be reduced and a change in direction of air can be decreased, so a loss of airflow can be reduced.

As the loss of airflow is reduced, suction force can be increased and the lifetime of the battery 40 for supplying power to the suction motor 20 can be increased.

The cleaner 1 may further include an upper motor housing 26 covering a portion of the top of the suction motor 20 and a lower motor housing 27 covering a portion of the bottom of the suction motor 20. The lower motor housing 27 may be integrally formed with the second body 12 or may be coupled to the second body 12.

The suction motor 20 may be disposed inside the motor housings 26 and 27 and the flow guide 22 may be disposed to cover the upper motor housing 26.

At least a portion of the flow guide 22 may be spaced apart from the upper motor housing 26. Further, at least a portion of the flow guide 22 may be spaced apart from the second body 12.

Accordingly, a first air passage 232 is defined by the inner side of the flow guide 22 and the outer side of the upper motor housing 26 and a second air passage 234 is defined by the outer side of the flow guide 22 and the inner side of the second body 12.

According to the present invention, the single flow guide 22 forms the first air passage 232 and the second air passage 234 and the number of parts for the air passages can be decreased, so the structure is simplified.

The first air passage 232 functions as a suction passage and the second air passage 234 functions as an exhaust passage.

The air discharged from the second cyclone unit 190 flows to the suction motor 20 through the first air passage 232 and the air discharged from the suction motor 20 flows through the second air passage 234 and is then discharged outside.

The handle unit 3 may include a handle 30 for a user to hold and a battery housing 410 under the handle 30.

The handle 30 may be disposed behind the suction motor 20.

As for directions, with respect to the suction motor 20 in the cleaner 1, the direction in which the suction unit 5 is positioned is the front direction and the direction in which the handle 30 is positioned is the rear direction.

The battery 40 may be disposed behind the first body 10. Accordingly, the suction motor 20 and the battery 40 may be arranged not to vertically overlap each other and may be disposed at different heights.

According to the present invention, since the suction motor 20 that is heavy is disposed ahead of the handle 30 and the battery 40 that is heavy is disposed behind the handle 30, so weight can be uniformly distributed throughout the cleaner 1. It is possible to prevent injuries to the user's wrist when a user cleans with the handle 30 in his/her hand. That is, since the heavy components are distributed at the front and rear portions and at different heights in the cleaner 1, it is possible to prevent the center of gravity of the cleaner 1 from concentrating on any one side.

Since the battery 40 is disposed under the handle 30 and the suction motor 20 is disposed in front of the handle 30, there is no component over the handle 30. That is, the top of the handle 30 forms a portion of the external appearance of the top of the cleaner 1.

Accordingly, it is possible to prevent any component of the cleaner 1 from coming in contact with the user's arm while the user cleans with the handle 30 in his/her hand.

The handle 30 may include a first extension 310 extending vertically to be held by a user and a second extension 320 extending toward the suction motor 20 over the first extension 310. The second extension 320 may at least partially horizontally extend.

A stopper 312 for preventing a user's hand holding the first extension 310 from moving in the longitudinal direction of the first extension 310 (vertically in FIG. 2) may be formed on the first extension 310. The stopper 312 may extend toward the suction unit 5 from the first extension 310.

The stopper 312 is spaced apart from the second extension 320. Accordingly, a user is supposed to hold the first extension 310, with some of the fingers over the stopper 312 and the other fingers under the stopper 312.

For example, the stopper 312 may be positioned between the index finger and the middle finger.

According to this arrangement, when a user holds the first extension 310, the longitudinal axis A1 of the suction unit 5 may pass through the user's wrist.

When the longitudinal axis A1 of the suction unit 5 passes through the user's wrist and the user's arm is stretched, the longitudinal axis A1 of the suction unit 5 may be substantially aligned with the user's stretched arm. Accordingly, there is the advantage in this state that the user uses minimum force when pushing or pulling the cleaner 1 with the handle 30 in his/her hand.

The handle 30 may include an operation unit 326. For example, the operation unit 326 may be disposed on an inclined surface of the second extension 320. It is possible to input instructions to turn on/off the cleaner (suction motor) through the operation unit 326.

The operation unit 326 may be disposed to face a user. The operation unit 326 may be disposed opposite to the stopper 312 with the handle 30 therebetween.

The operation unit 326 is positioned higher than the stopper 312. Accordingly, a user can easily operate the operation unit 390 with his/her thumb with the first extension 310 in his/her hand.

Further, since the operation unit 326 is positioned outside the first extension 310, it is possible to prevent the operation unit 326 from being unexpectedly operated when a user cleans with the first extension 310 in his/her hand.

A display unit 322 for showing operational states may be disposed on the second extension 320. The display unit 322 may be, for example, disposed on the top of the second extension 320. Accordingly, a user can easily check the display unit 322 on the top of the second extension 320 while cleaning. The display 322, for example, can show the remaining capacity of the battery 40 and the intensity of the suction motor.

The display unit 322, though not limited, may include a plurality of light emitting units. The light emitting units may be spaced from each other in the longitudinal direction of the second extension 320.

The battery housing 60 may be disposed under the first extension 310.

The battery 40 may be detachably combined with the battery housing 60. For example, the battery 40 may be inserted into the battery housing 60 from under the battery housing 60.

The rear side of the battery housing 60 and the rear side of the first extension 310 may form a continuous surface. Accordingly, the battery housing 60 and the first extension 310 can be shown like a single unit.

When the battery 40 is inserted in the battery housing 60, the bottom of the battery 40 may be exposed to the outside. Accordingly, when the cleaner 1 is placed on the floor, the battery 40 can be in contact with the floor.

According to this structure, there is the advantage that the battery 40 can be directly separated from the battery housing 60.

Further, since the bottom of the battery 40 is exposed to the outside, the bottom of the battery 40 can come in direct contact with the air outside the cleaner 1, so the battery 40 can be more efficiently cooled.

The battery housing 60 may include an outer housing 600 and an inner housing 610. The inner housing 610 may be inserted under the outer housing 600.

The inner housing 610 may be fixed to one or more of the outer housing 600 and the first body 10. Further, the battery 40 may be coupled to the inner housing 610.

According to the present invention, the inner housing 610 is inserted into the outer housing 600 and then the battery 40 is inserted to be coupled to the inner housing 610, so it is possible to prevent the outer housing 600 from deforming or to prevent the outer housing 600 from being damaged when inserting or separating the battery 40.

The inner housing 610 may include charging stand connection terminals 628 for charging the battery 40 coupled to the inner housing 610. It is possible to bring the charging stand connection terminals 628 in contact with terminals of a charging stand (not shown) by placing the cleaner 1 on the charging stand.

The battery housing 60 may include battery connection terminals 670 that are connected to battery terminals 490 in the battery 40 inserted in the battery housing 60. The battery connection terminals 670 may be connected to the battery terminals 490 through the top of the battery 40.

Obviously, it may be possible to integrally form the inner housing 610 with the outer housing 600 without separately forming the inner housing 610.

The inner housing 610 may include a pair of hinge coupling portions 620 to which a hinge 162 of the body cover 16 is coupled. The hinge coupling portions 620 may be spaced at a predetermined distance from each other.

Referring to FIG. 3, the cleaner 1 may further include a filter unit 50 having air exits 522 for discharging the air that has passed through the suction motor 20. For example, the air exits 522 may include a plurality of openings and the openings may be circumferentially arranged. Accordingly, the air exits 522 may be arranged in a ring shape.

The filter unit 50 may be detachably coupled to the top of the main body 2. The filter unit 50 may be detachably inserted in the second body 12. The air exits 522 are disposed above the suction motor in a state in which the longitudinal axis A1 is horizontally positioned.

When the filter unit 50 is combined with the main body 2, a portion of the filter unit 50 is positioned outside the second body 12. Accordingly, a portion of the filter unit 50 is inserted in the main body 2 through the open top of the main body 2 and the other portion protrudes outside from the main body 2.

The height of the main body 2 may be substantially the same as the height of the handle 30. Accordingly, the filter unit 50 protrudes upward from the main body 2, so a user can easily hold and separate the filter unit 50.

When the filter unit 50 is combined with the main body 2, the air exits 522 are positioned at the upper portion of the filter unit 50. Accordingly, the air discharged from the suction motor 20 is discharged upward from the main body 2.

According to this embodiment, it is possible to prevent the air discharged from the air exits 522 from flowing to a user while the user cleans using the cleaner 1.

The main body 2 may further include a pre-filter 29 for filtering the air flowing into the suction motor 20. The pre-filter 29 may be disposed inside the flow guide 22. Further, the pre-filter 29 is seated over the upper motor housing 16 and may surround a portion of the upper motor housing 26. That is, the upper motor housing 26 may include a filter support for supporting the pre-filter 29.

When the filter unit 50 is mounted on the main body 2, the filter unit 50 can press the pre-filter 29 to prevent movement of the pre-filter 29.

For example, the filter unit 50 can press down the pre-filter 29. Therefore, according to the present invention, there is no need for a structure for fixing the pre-filter 29.

Figure 6:
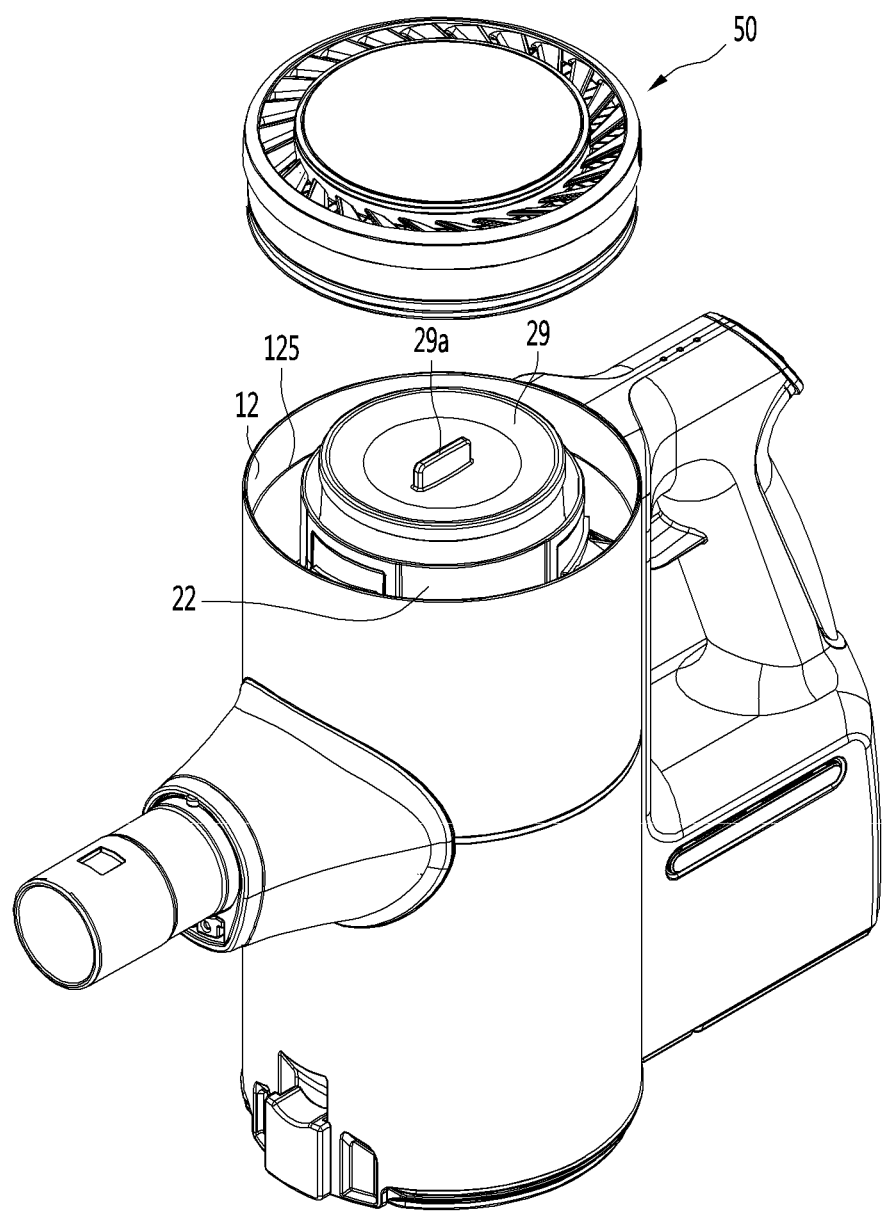
FIG. 6 is a view showing when a filter unit according to an embodiment of the present invention has been separated from the main body.
Figure 7:
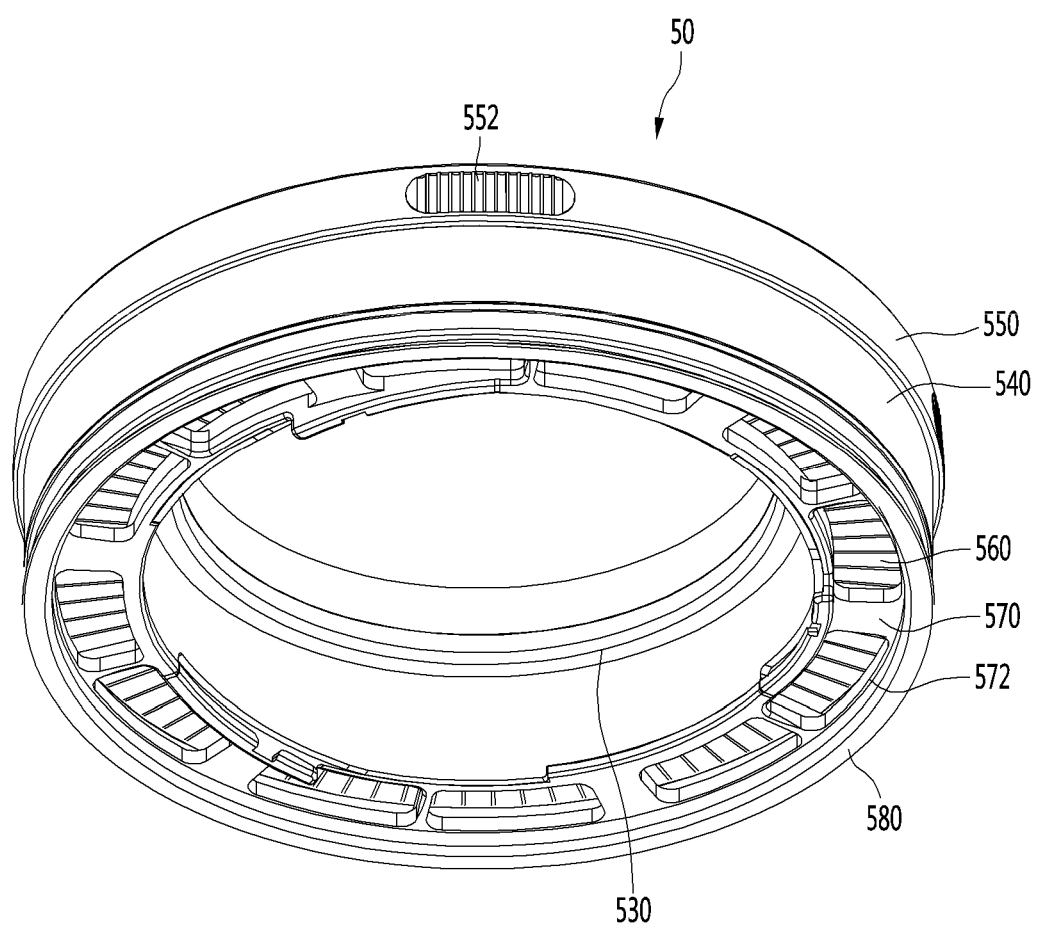
FIG. 7 is a view showing the bottom of the filter unit according to an embodiment of the preset invention.
Figure 8:
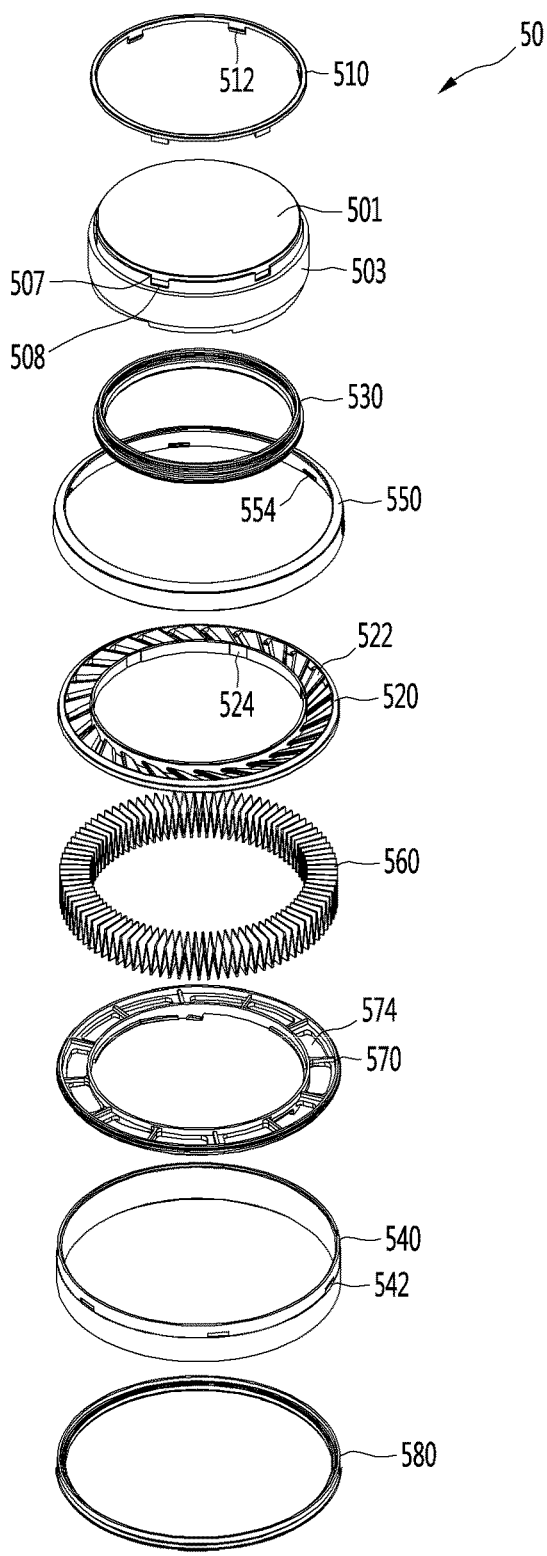
FIG. 8 is an exploded perspective view of the filter unit shown in FIG. 7.
Figure 9:
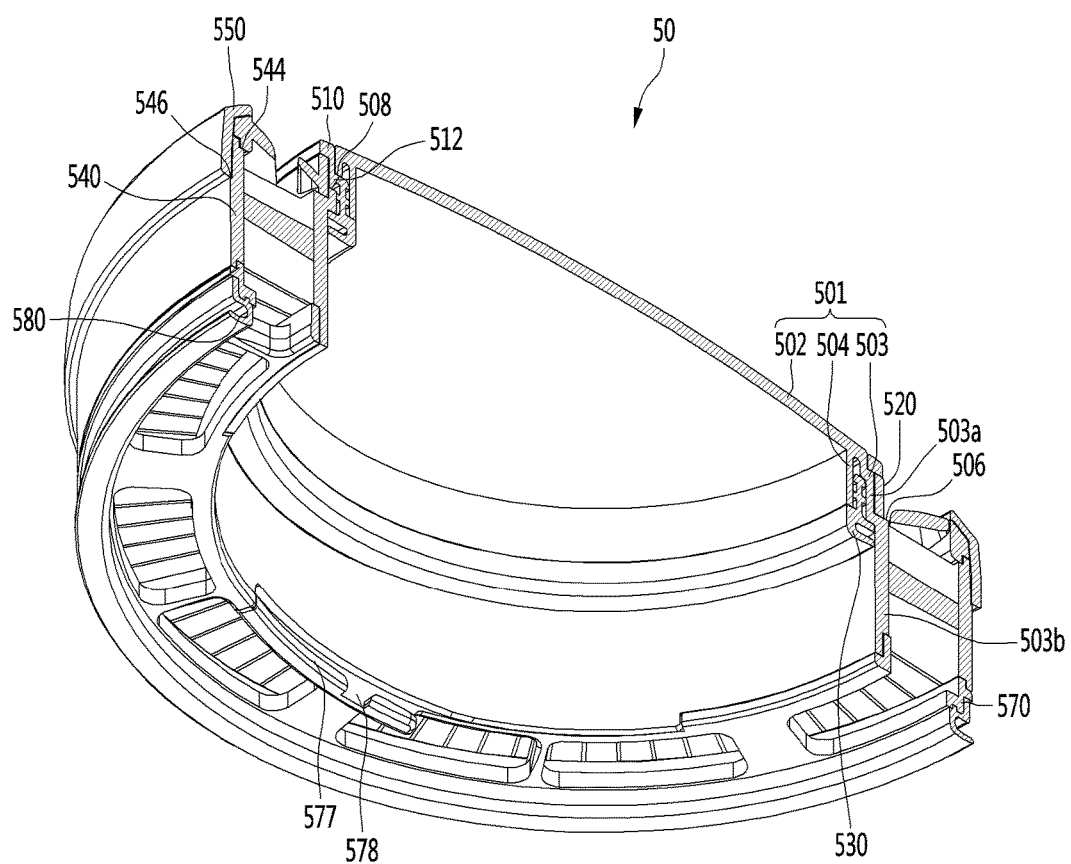
FIG. 9 is a cross-sectional perspective view of the filter unit shown in FIG.

FIG. 6 is a view showing when a filter unit according to an embodiment of the present invention has been separated from the main body, FIG. 7 is a view showing the bottom of the filter unit according to an embodiment of the preset invention, FIG. 8 is an exploded perspective view of the filter unit shown in FIG. 7, and FIG. 9 is a cross-sectional perspective view of the filter unit shown in FIG. 7.

Referring to FIGS. 5 to 9, the filter unit 50 can be separated from the main body 2.

For example, the filter unit 50 may be separated upward from the main body 2.

Since the impeller 200 is positioned at the upper portion in the suction motor 20, the pre-filter 29 may be disposed to cover the upper motor housing 26 in order to cover the impeller 200.

Accordingly, when the filter unit 50 is separated from the main body 2, the pre-filter 29 can be exposed to the outside, and accordingly, the pre-filter 29 can be separated.

The pre-filter 29 may have a knob 29a. A user can separate the pre-filter 29 from the main body 2 by holding the knob 29a of the pre-filter 29 exposed to the outside and then lifting up the pre-filter 29. Since the pre-filter 29 can be separated from the main body 2, a user can easily clean the pre-filter 29.

The filter unit 50 may further include a filter 560 for filtering the air discharged from the suction motor 20 and a filter frame for supporting the filter 560.

The filter 560, for example, may be an HEPA (High Efficiency Particulate Air) filter.

The filter 560 may be positioned around the flow guide 22 to prevent an increase in height of the cleaner 1 when the filter unit 50 is coupled to the main body 2.

That is, the filter 560, for example, may be formed in a ring shape and a portion of the flow guide 22 may be positioned in the area defined by the filter 560.

Further, at least a portion of the pre-filter 29 may be inserted in the area defined by the filter 560. That is, the filter 560 surrounds the pre-filter 29.

The filer frame may be coupled to the flow guide 22 between the second body 12 and the flow guide 22.

The filter frame may have an inner frame 501 and an outer frame 540 disposed around the inner frame 501.

The outer side of the inner frame 501 and the inner side of the outer frame 540 are spaced apart from each other and the filter 560 may be disposed between the inner frame 501 and the outer frame 540.

The filter frame may further include an exhaust frame 520 having air exits 522 and covering the top of the filter 560 and a filter cover 570 covering the bottom of the filter 560.

In detail, the inner frame 501 may include a top portion 502 and a circumferential side portion 503 extending downward from the edge of the top portion 502.

The circumferential side portion 503 may include a first part 503a and a second part 503b extending downward from the first part 503a and having a larger diameter than the first part 503a.

A seat 506 for the exhaust frame 520 may be formed between the first part 503a and the second part 503b by the difference in diameter of the first part 503a and the second part 503b.

The seat 506 is formed along the circumferential side portion 503 at a predetermine distance under the top portion 502.

The exhaust frame 520 may be formed in a ring shape to be able to be seated on the seat 506. Further, the inner diameter 520 of the exhaust frame 520 may the same as or larger than the outer diameter of the first part 503a of the circumferential side portion 503. Further, the outer diameters of the seat 506 and the second part 503b may be larger than the inner diameter of the exhaust frame 520.

Accordingly, the exhaust frame 520 can be seated on the seat 506, with the top portion 502 and the first part 503a of the circumferential side portion 503 of the inner frame 501 fitted in the exhaust frame 520.

The filter unit 50 may further include an inner deco member 510 coupled to the edge of the inner frame 501. The inner deco member 510 may be formed in a ring shape.

The inner deco member 510 includes hooks 512 for locking the inner frame 501.

Hook coupling holes 508 for locking the hooks 512 may be formed at the inner frame 501.

The hook coupling holes 508 may be formed at the first part 503a of the circumferential side portion 503. Further, a guide groove 507 for guiding the hooks 512 to the hook coupling holes 508 may be formed on the first part 503a of the circumferential side portion 503. The guide groove 507 may vertically extend.

Accordingly, when the hooks 512 are aligned with the hook coupling holes 508 while being moved along the guide groove 507, the hooks 512 can be inserted into the hook coupling holes 508.

The exhaust frame 520 is seated on the seat 506 of the inner frame 501 and then the inner deco member 510 may be coupled to the inner frame 501.

To this end, a guide groove 524 for proving a space in which the hooks 512 of the inner deco member 510 can move may be formed on the inner side of the exhaust frame 520. The guide groove 524 may vertically extend.

Accordingly, the hooks 512 of the inner deco member 510 can move along the guide groove 507 of the inner frame 501 and the guide groove 524 of the exhaust frame 520.

When the inner deco member 510 is coupled to the inner frame 501, the inner deco member 510 may be seated on the top of the exhaust frame 520.

Therefore, according to the present invention, there is no need for a specific part for fixing the exhaust frame 520 to the inner frame 501.

The outer frame 540 can support the exhaust frame 520. The outer frame 540 may be fixed to the exhaust frame 520, for example, by bonding in contact with the bottom of the exhaust frame 520. However, it should be noted that the way of fixing the exhaust frame 520 and the outer frame 540 to each other is not limited in the present invention.

A seating groove 544 for seating the exhaust frame 520 may be formed on the outer frame 540 so that the outer frame 540 supports the exhaust frame 520.

When the outer frame 540 is fixed to the exhaust frame 520, a filter space is defined between the outer frame 540 and the circumferential side portion 503 of the inner frame, so the filter 560 can be inserted in the filter space. When the filter 560 is inserted in the filter space, it vertically overlaps the air exits 522.

The filter unit 50 may further an outer deco member 550 coupled to the outer frame 540. The outer deco member 550 may be coupled to the outer frame 540 while surrounding a portion of the circumference of the exhaust frame 520. Further, the outer deco member 550 may surround the upper portion of the outer frame 540. A seating step 546 for seating the lower end of the outer deco member 550 may be formed on the outer side of the outer frame 540.

One or more coupling protrusions 554 for coupling the outer frame 540 may be formed on the inner side of the outer deco member 550 and one or more coupling grooves 542 for receiving the coupling protrusions 554 may be formed on the outer side of the outer frame 540.

An anti-slip portion 552 for preventing a hand of a user from sliding when the user separate or couple the filter unit 50 may be formed on the outer side of the outer deco member 550. The anti-slide portion 552, for example, may be composed of a plurality of protrusions formed on the outer side of the outer deco member 550.

A plurality of anti-slide portions 552 may be spaced from each other circumferentially around the outer deco member 550 to effectively prevent slide of a user's hand.

The filter cover 570, for example, may be formed in a ring shape and has one or more air openings 574.

The filter cover 570 can cover the filter 560 disposed between the outer frame 540 and the inner frame 501.

The filter cover 570 can support the bottoms of the outer frame 540 and the inner frame 501 and may be combined with the outer frame 540 and the inner frame 501, for example, by bonding.

The filter unit 50 may further have sealing members 530 and 580 for sealing the filter unit 50 and the main body 2 when the filter unit 50 is coupled to the main body 2.

Figure 10:
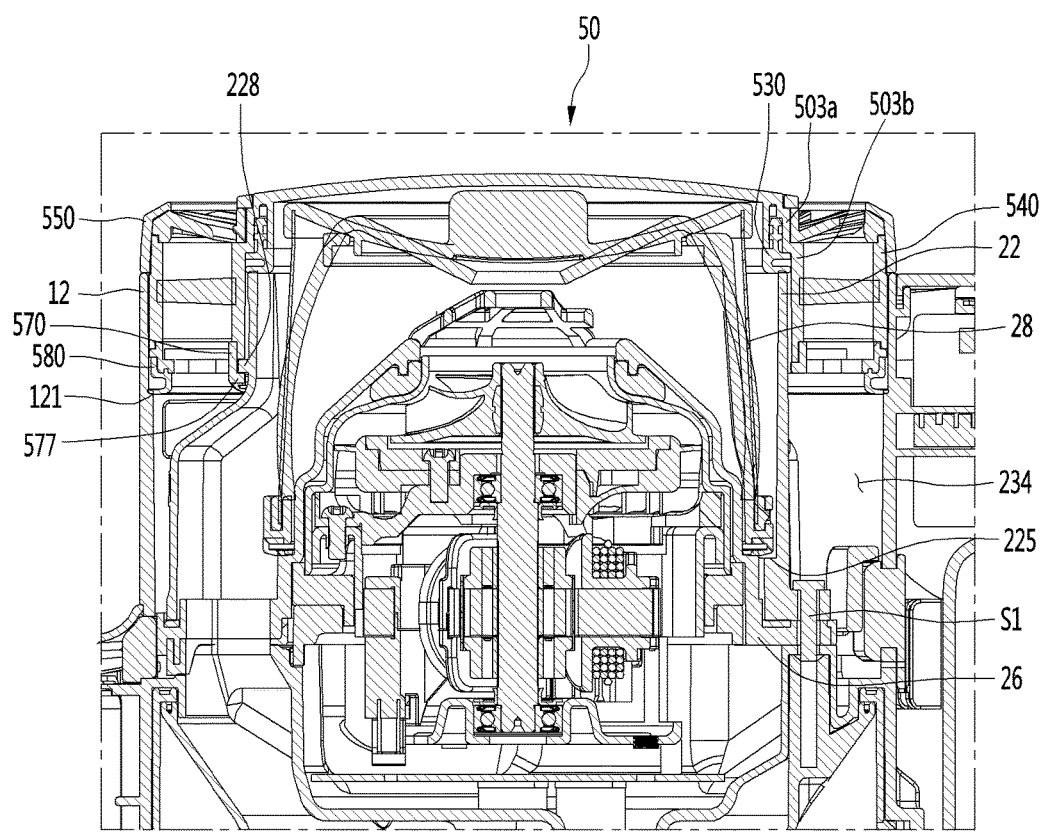
FIG. 10 is a cross-sectional view when the filter unit according to an embodiment of the present invention has been coupled to the main body.

FIG. 10 is a cross-sectional view when the filter unit according to an embodiment of the present invention has been coupled to the main body.

Referring to FIGS. 9 and 10, the sealing members 530 and 580 may include an inner sealing member 530 (or a first sealing member) for preventing the air in the flow guide 22 from leaking to the outside through the hook coupling holes 508 of the inner frame 501.

The inner sealing member 530 may be coupled to the inner side of the circumferential side portion 503 of the inner frame 501.

In detail, a sealing rib 504 may extend downward from the top portion 502 of the inner frame 501. The sealing rib 504 is spaced apart from the circumferential side portion 503 of the inner frame 501. The sealing rib 504 is continuously formed in the circumferential direction of the top portion 501.

Accordingly, a space for inserting the inner sealing member 530 is defined between the sealing rib 504 and the circumferential side portion 503 of the inner frame 501 and a portion of the inner sealing member 530 is fitted in the space.

When the inner sealing member 530 is coupled to the inner frame 501, the inner sealing member 530 is in contact with the bottom of the first part 503*a* of the circumferential side portion 503, the inner side of the second part 503*b*, and the bottom of the sealing rib 504.

Further, when the filter unit 50 is coupled to the main body 2, the inner sealing member 530 is seated on the upper end of the flow guide 22.

Therefore, according to the present invention, the inner sealing member 530 is seated on the upper end of the flow guide 22 in contact with the bottom of the first part 503*a* of the circumferential side portion 503, the inner side of the second part 503*b*, and the bottom of the sealing rib 504, so the air flowing through the flow guide 22 is prevented from flowing into the hook coupling holes 508.

Further, the inner sealing member 530 can prevent air from leaking into the gap between the outer side of the flow guide 22 and the inner side of the circumferential side portion 503 of the inner frame 501.

A gap may be provided between the outer side of the filter unit 50 and the inner side of the second body 12 to separate the filter unit 50 from the main body 2.

Further, sealing members 530 and 580 may further include an outer sealing member 580 (or a second sealing member) for preventing the air in the second air passage 234 from flowing into the gap between the outer frame 540 and the second body 12 without passing through the filter 560.

The outer sealing member 580 may be coupled to the edge of the filter cover 570. Though not limited, the outer sealing member 580 may be fitted on the filter cover 570 or may be integrally formed with the filter cover 570 by injection molding.

A support step 125 for supporting the outer sealing member 580 may be formed on the inner side of the second body 12. The support step 125 may be formed by increasing the thickness of the second body 12.

When the filter unit 50 is coupled to the main body 2, the outer sealing member 580 can be seated on the support step 125.

Accordingly, it is possible to prevent the air in the second air passage 234 from flowing into the gap between the outer frame 540 and the inner side of the second body 12.

Further, when the filter unit 50 is coupled to the main body 2, the outer deco member 550 is seated on the second body 12 of the main body 2. Accordingly, a user can separate the filter unit 50 from the main body 2 by holding the outer deco member 550 and rotating the filter unit 50 in a predetermined direction.

Further, when the filter unit 50 is coupled to the main body 2, a portion of the filter 560 may be positioned inside the main body and the other portion may be positioned outside the main body 2.

According to the present invention, since a portion of the filter unit 50 is exposed outside the main body 2, it is possible to hold the filter unit 50. Further, the filter 560 may be positioned inside the portion protruding outside the main body 2, so the size of the filter 560 can be increased. Accordingly, the area of the filter 560 that can come in contact with air increases, the ability to purify air can be improved.

Figure 11:
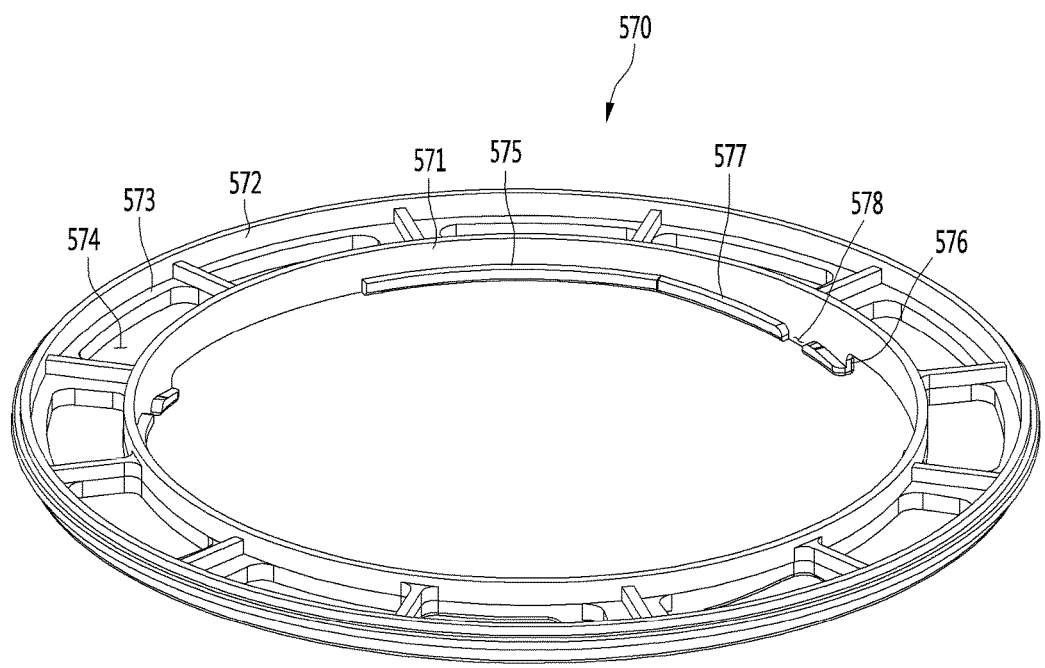
FIG. 11 is a perspective view of a filer cover according to an embodiment of the present invention.
Figure 12:
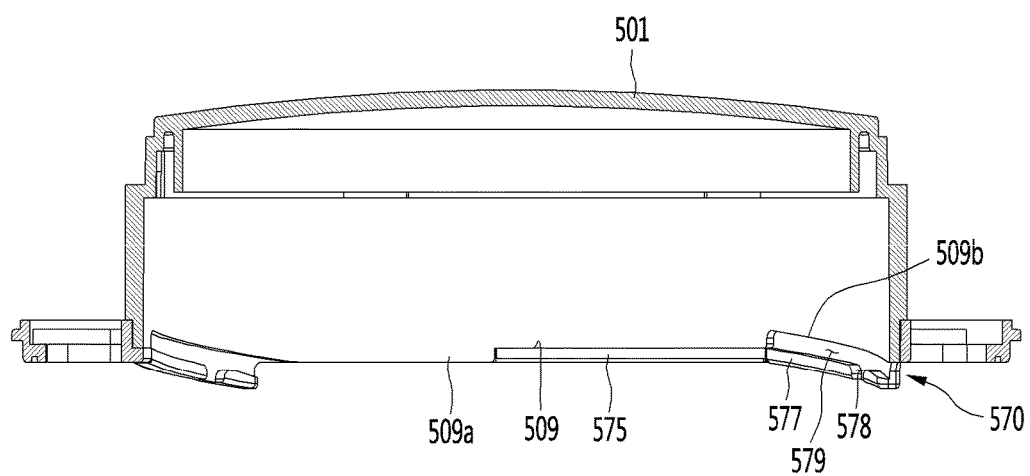
FIG. 12 is a cross-sectional view after the inner frame is coupled to the filter cover shown in FIG. 11.
Figure 13:
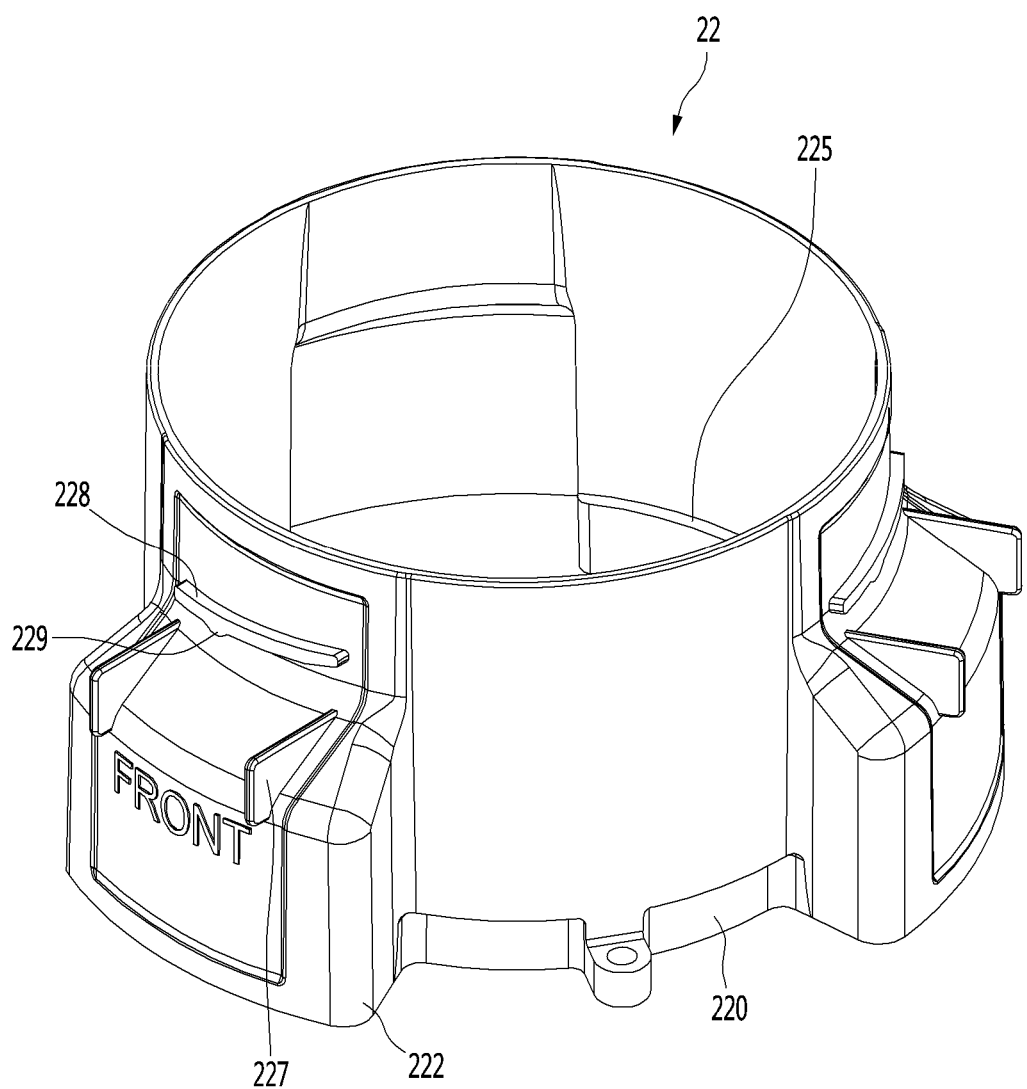
FIG. 13 is a perspective view of a flow guide according to an embodiment of the present invention.
Figure 14:
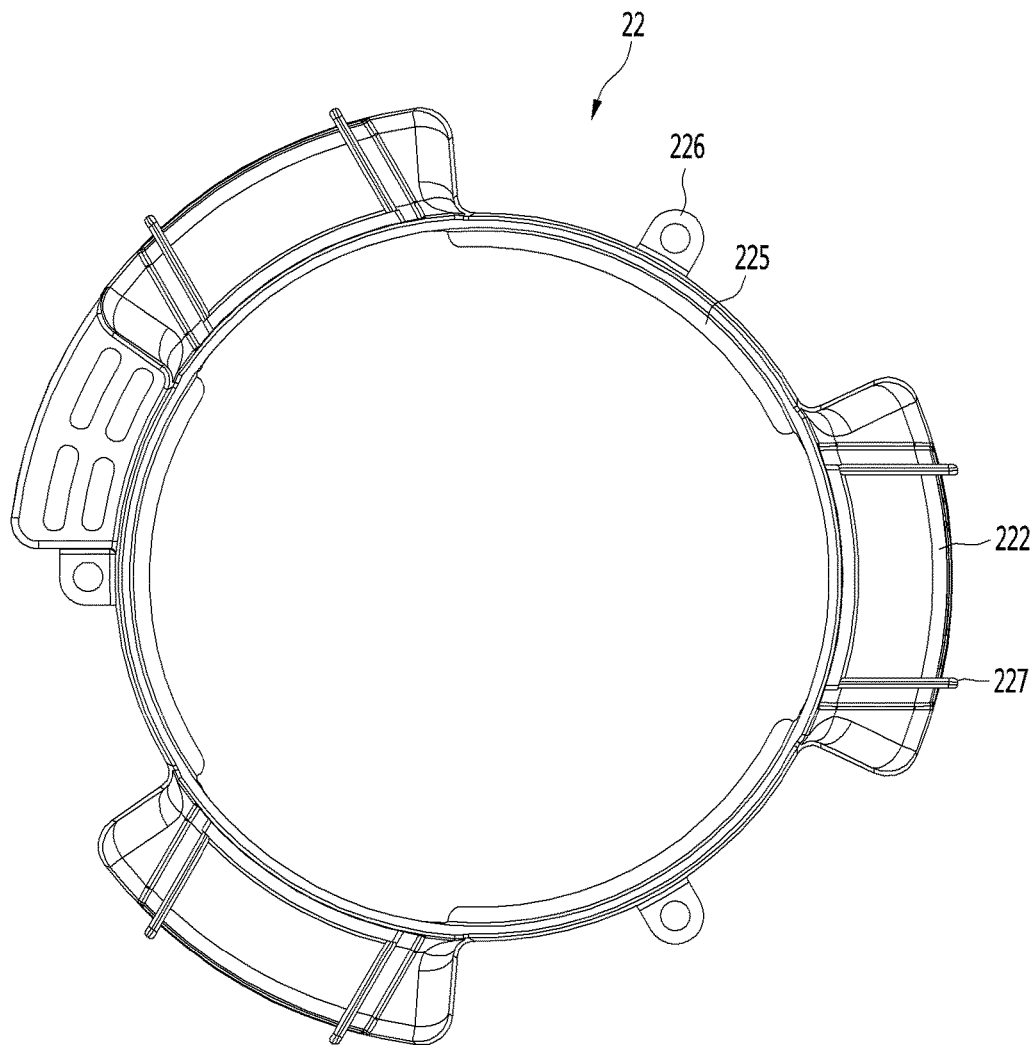
FIG. 14 is a plan view of the flow guide according to an embodiment of the present invention.

FIG. 11 is a perspective view of a filer cover according to an embodiment of the present invention, FIG. 12 is a cross-sectional view after the inner frame is coupled to the filter cover shown in FIG. 11, FIG. 13 is a perspective view of a flow guide according to an embodiment of the present invention, and FIG. 14 is a plan view of the flow guide according to an embodiment of the present invention.

Referring to FIGS. 10 to 14, the filter cover 570 may include an inner body 571, an outer body 572 spaced from the inner body 571, and a connection body 573 connecting the inner body 571 and the outer body 572 to each other.

The inner body 571 and the outer body 571 may be formed in a ring shape.

The one or more air openings 574 are formed through the connection body 573.

A plurality of frame support ribs 575 for supporting the bottom 509 of the inner frame 501 may be formed on the inner side of the inner body 571. The frame support ribs 575 may be spaced circumferentially on the inner body 571.

Rib coupling portions 577 for coupling the flow guide 22 may be formed on the inner side of the inner body 571.

The inner body 571 may include extensions 576 so that the rib coupling portions 577 can incline downward. The extensions 576 protrude downward on the bottom of the inner body 571 and the rib coupling portions 577 may be disposed at the rib coupling portions 577.

Accordingly, the rib coupling portions 577 circumferentially extend from ends of the frame support ribs 575 at an angle downward.

Inclining downward the rib coupling portions 577 is for coupling or separating the filter unit 50 to or from the main body by rotating it and lifting the filter unit 50 when separating the filter unit 50 from the main body 2.

When the filter unit 50 is lifted in the process of separation, a user can know that the filter 50 is being separated.

In order to separate the filter unit 50 by rotating the filter unit 50, a rotational force should be applied to the filter unit 50, so the filter unit 50 is not separated from the main body 2 even if it is pulled. Accordingly, it is possible to prevent the filter unit 50 from being unexpectedly separated from the main body 2.

Each of the rib coupling portions 577 may include a slot 578 for receiving fixing protrusions 2229 of the flow guide 22, which will be described below. The slots 578 may be groove or holes.

The inner frame 501 may further include a contact portion 509a extending downward from the bottom 509 of the inner frame 501. When the filter cover 570 and the inner frame 501 are combined, the contact portion 509a may be in contact with side surface of the frame support ribs 575.

The inner frame 501 may include recessions 509b that are recessed upward to form rib receiving parts 579 for receiving the fixing ribs 228 of the flow guide 22.

The recessions 509b are spaced upward from the coupling ribs 557 when the inner frame 501 is combined with the filter cover 570.

The recessions 509b may be inclined so that the fixing ribs 228 of the flow guide 22 can be inserted into the rib receiving parts 579 between the recession 509b and the rib coupling portions 577 when the filter unit 50 is rotated and moved down.

Accordingly, the rib receiving parts 579 extend downward at an angle.

The rib receiving parts 579 may be considered as spaces between the inner frame 501 and the filter cover 570. That is, the fixing ribs 228 of the flow guide 22 can be fitted between the inner frame 501 and the filter cover 570.

The flow guide 22 may include a guide body 220 that is open at the top and the bottom. The guide body 220 may include passage walls 222 for forming the first air passage 232 through which the air discharged from the second cyclone unit 130 flows.

The passage walls 222 may radially protrude from the guide body 220.

The flow guide 22 may have a plurality of passage walls 222 that is circumferentially spaced for smooth airflow.

The suction motor 20 is positioned inside the flow guide 22, but the gap between the flow guide 22 and the suction motor 20 should be small in order not to increase the size of the main body 2. However, when the gap between the flow guide 22 and the suction motor 20 is small, airflow is not smooth.

However, when the passage walls 222 protrude from the guide body 220, as in the present invention, a sufficient cross-sectional area of the passage for airflow can be secured by the passage walls 222, so air can more smoothly flow.

The passage walls 222 are formed at a predetermined distance under the upper end of the flow guide 22 so that the upper portion of the flow guide 22 can be inserted inside the inner frame 501 and the passage walls 222 do not interfere with the filter unit 50.

Further, the outer diameter of the upper portion of the guide body 220 may be smaller than the inner diameter of the circumferential side of the inner frame 501. Accordingly, when the filter unit 50 is coupled to the main body 2, the upper portion of the flow guide 22 is inserted in the filter unit 50, so the inner sealing member 530 can be seated on the upper end of the flow guide 22.

According to the present invention, since a portion of the flow guide 22 is inserted in the filter unit 50, an increase in height of the cleaner 1 can be minimized.

Filter support steps 225 may be formed on the inner side of the guide body 220 to support the lower end of the pre-filter 29. The filter support steps 225 may protrude on the inner side of the guide body 220.

Fastening portions 226 for fastening the motor housings 26 and 27 may be formed at the lower end of the guide body 220.

The fastening portions 226 of the guide body 220 may be seated on the upper motor housing 26. In this state, fasteners S1 can be coupled to the upper motor housing 26 through the fastening portions 226 from above.

The fasteners S1 may be coupled to the discharge guide 28 after passing through the upper motor housing 26 and the lower motor housing 27. According to this structure, it is possible to fasten the parts using a small number of fasteners, so the structure is simple and the assembly is easy.

The flow guide 22 may include fixing ribs 228 for coupling to the filter unit 50. The fixing ribs 228 may circumferentially extend at an angle so that the height of the filter unit 50 can be changed when the filter unit 50 rotates. Further, a fixing protrusion 229 may be formed on the bottom of each of the fixing ribs 228.

Meanwhile, reinforcing ribs 227 may be formed on the passage walls 222. The flow guide 22 is spaced apart from the inner side of the second body 12 to form the second air passage 234.

The reinforcing ribs 227 may extend toward the second body 12 from the passage walls 222.

As described above, as the flow guide 22 is spaced apart from the inner side of the second body 12, when external force is applied to the second body 12, the second body 12 may be deformed toward the flow guide 22.

However, according to the present invention, since the reinforcing ribs 227 are formed on the passage walls 222, even if external force is applied to the second body 12, the second body 12 comes in contact with the reinforcing ribs 227, so deformation of the second body 12 can be limited.

Since the passage walls 222 protrude from the guide body 220, when the reinforcing ribs 227 are formed on the passage walls 222, the length of the reinforcing ribs 227 can be reduced.

Figure 15:
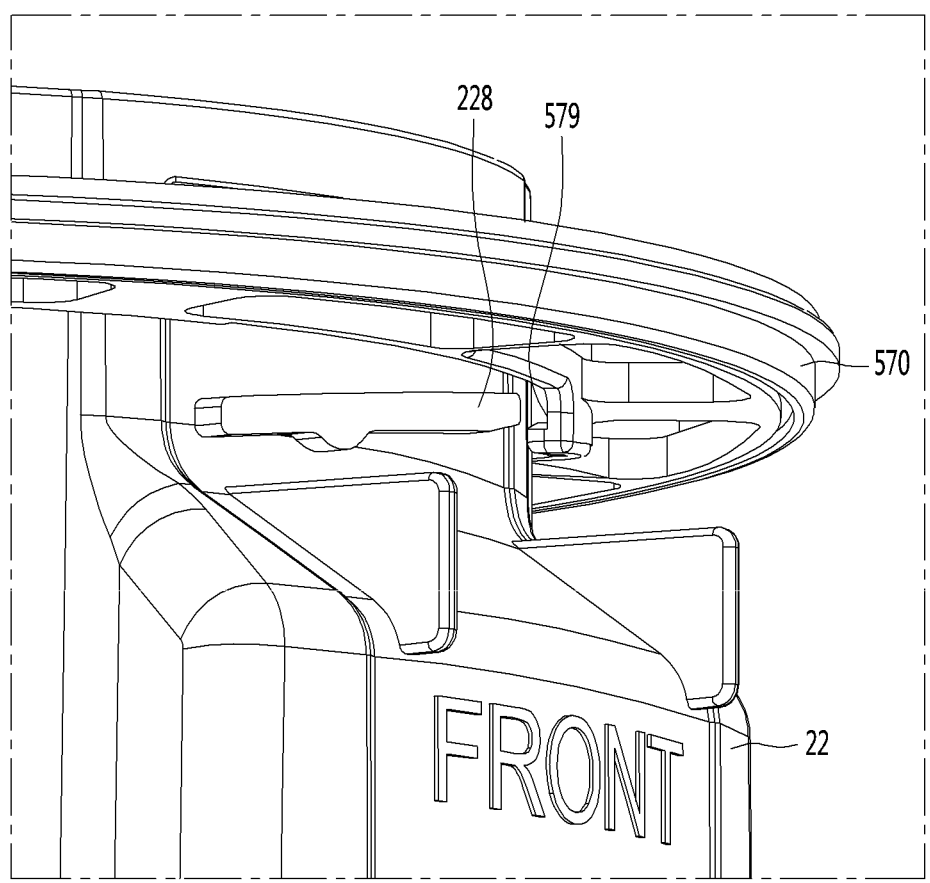
FIG. 15 is a view before the filter unit according to an embodiment of the present invention is coupled to the flow guide.
Figure 16:
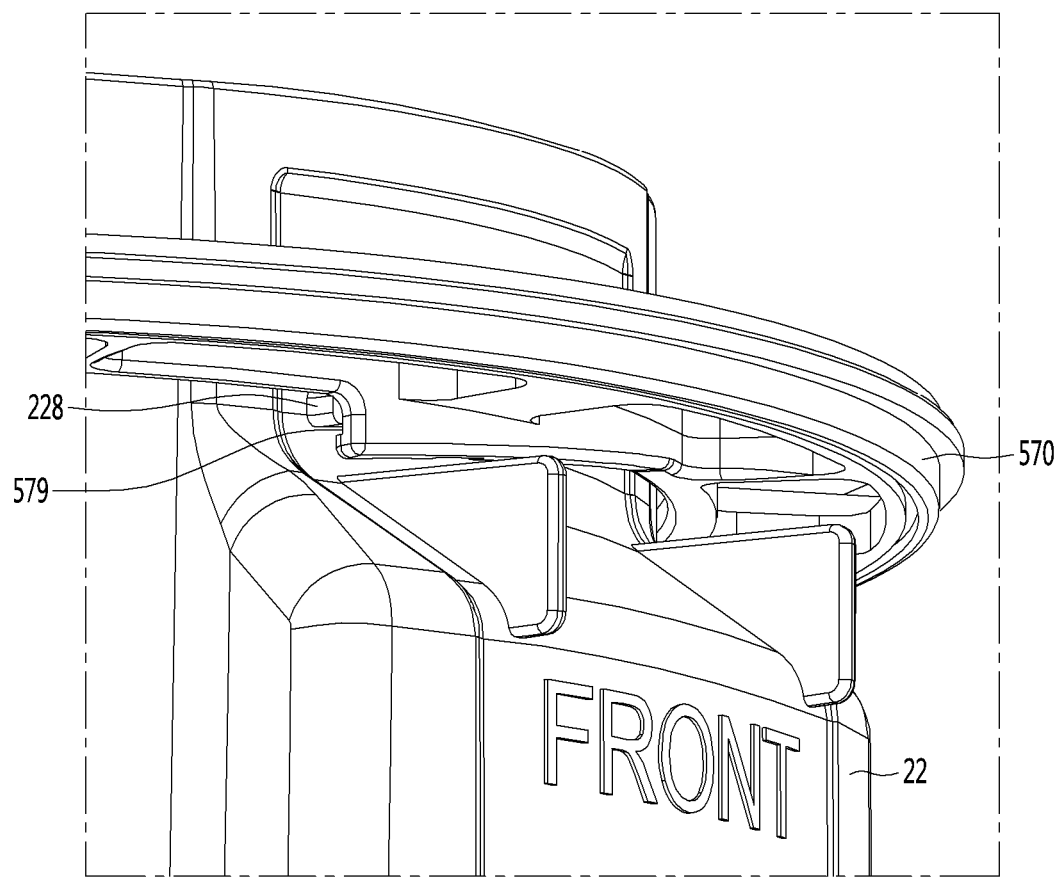
FIG. 16 is a view after the filter unit according to an embodiment of the present invention is coupled to the flow guide.

FIG. 15 is a view before the filter unit according to an embodiment of the present invention is coupled to the flow guide and FIG. 16 is a view after the filter unit according to an embodiment of the present invention is coupled to the flow guide.

A process of combining the filter unit 50 is described with reference to FIGS. 15 and 16.

A portion of the lower portion of the filter unit 50 is inserted into the second body 12 to couple the filter unit 50 to the main body 2.

Accordingly, the rib receiving parts 579 of the filter unit 50 and the fixing ribs 228 can be aligned.

In this state, the fixing ribs 228 are seated into the rib receiving parts 579 by rotating the filter unit 50. The rib receiving parts 579 may be positioned higher than the fixing ribs 228 so that the fixing ribs 228 can be easily inserted into the rib receiving parts 579.

Since the fixing ribs 228 extend at an angle, the filter unit 50 is moved down by the fixing ribs 228 when being rotated.

When the fixing protrusions 229 are inserted into the slots 578 of the rib coupling portions 577 while the fixing ribs 228 is inserted into the rib receiving parts 579, the filer unit 50 and the main body 2, that is, the flow guide 22 finish being combined.

Meanwhile, the filter unit 50 is rotated in another direction to separate the filter unit 50 from the main body 2. Since the fixing ribs 228 extend at an angle, the filter unit 50 is moved upward by the fixing ribs 228 when being rotated in the direction. When the fixing ribs 228 are separated out of the rib receiving parts 579, the filter unit 50 and the main body 2 are separated.

It is possible to separate the filer unit 50 from the main body 2 by lifting the filter unit 50 in this state.

Figure 17:
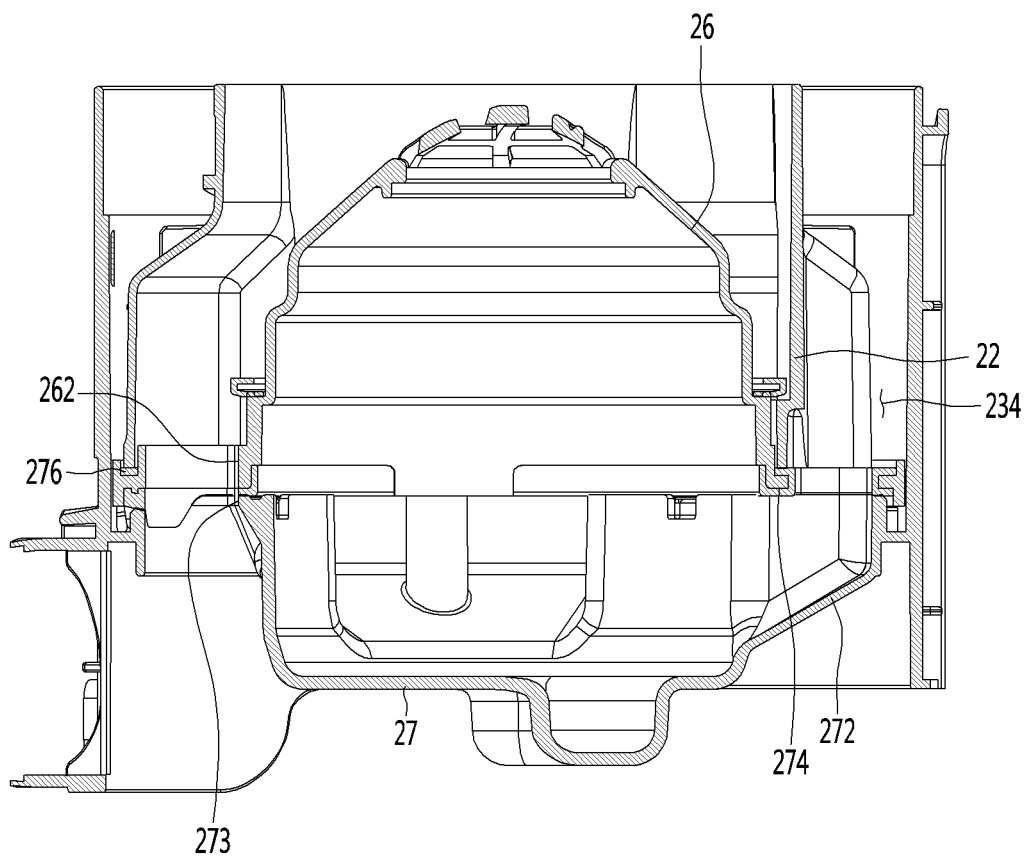
FIG. 17 is a view showing the structure of a motor housing and a second body according to an embodiment of the present invention.

FIG. 17 is a view showing the structure of the motor housing and the second body according to an embodiment of the present invention.

Referring to FIGS. 5 and 17, the lower motor housing 27 may be integrally formed with the second body 12.

A hole 273 for air flowing along the discharge guide 28 may be formed at the lower motor housing 27.

The lower motor housing 27 can support the upper motor housing 26. A first sealer 274 may be disposed between the lower motor housing 27 and the upper motor housing 26.

The lower motor housing 27 may further include an air guide 272 for guiding the air discharged from the suction motor 20 to the second air passage 234.

The upper motor housing 26 can support flow guide 22. A second sealer 274 may be disposed between the upper motor housing 26 and the flow guide 22.

A hole 262 through which the air that has passed through the hole 273 of the lower motor housing 27 passes may be formed also at the upper motor housing 26.

Figure 18:
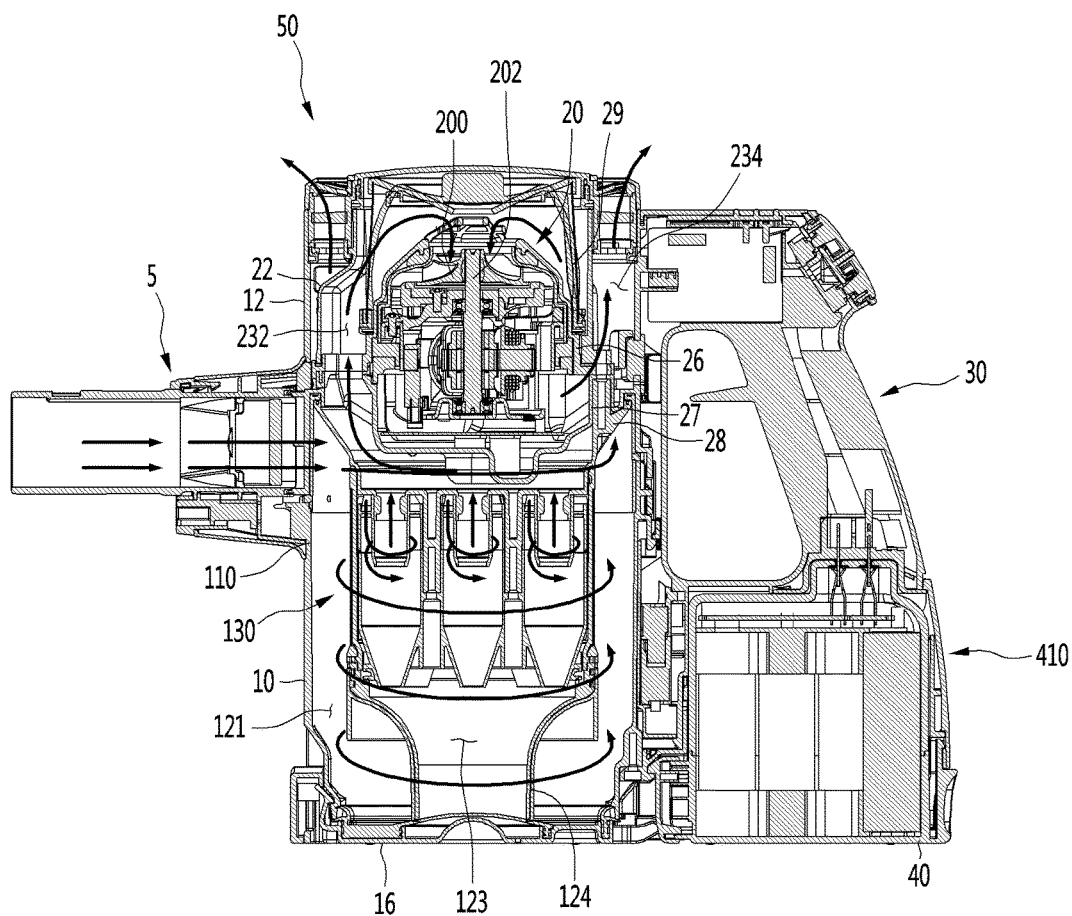
FIG. 18 is a view showing airflow in the cleaner according to an embodiment of the present invention.
Figure 19:
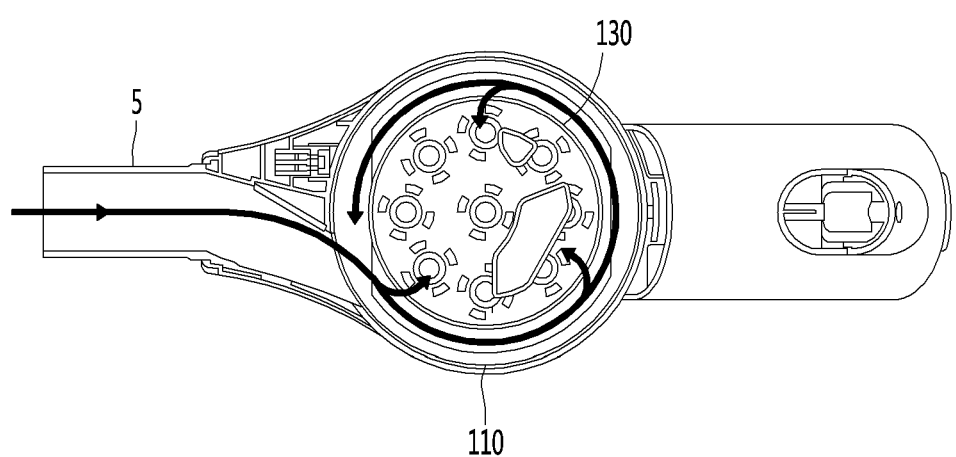
FIG. 19 is a horizontal cross-sectional view showing airflow in the cleaner according to an embodiment of the present invention.

FIG. 18 is a longitudinal cross-sectional view showing airflow in the cleaner according to an embodiment of the present invention and FIG. 19 is a horizontal cross-sectional view showing airflow in the cleaner according to an embodiment of the present invention.

The airflow in the cleaner 1 is described with reference to FIGS. 17 to 19.

Air and dust sucked through the suction unit 5 by the suction motor 20 are separated from each other while flowing along the inner side of the first cyclone unit 110.

The dust separated from the air drops into the first dust storage part 121. The air separated from the dust flows into the second cyclone unit 130. The air flowing in the second cyclone unit 130 is separated again from dust.

The dust separated from the air in the second cyclone unit 130 drops into the second dust storage part 123. On the other hand, the air separated from the dust in the second cyclone unit 130 is discharged upward to the suction motor 20 from the second cyclone unit 130.

The air discharged from the second cyclone unit 130 flows through the discharge guide 28, passes through the hole 273 of the lower motor housing 27, and then keeps flowing upward through the first air passage 232 of the flow guide 22. Further, the air in the first air passage 232 passes through the pre-filter 29.

The air that has passed through the pre-filter 29 passes through the suction motor 20 in the upper motor housing 27. The air flows in the suction motor 20 by the impeller 200 and is then discharged to the lower motor housing 27. The air discharged into the lower motor housing 27 is changed in direction by the air guide 272 and sent to the second air passage 234.

Further, the air flowing into the second air passage 234 is discharged outside through the air exits 522 after passing through the filter 560.

According to the present invention, passages for air are formed only in the main body and not formed in the handle unit 3. Accordingly, there is no need for a structure for sealing the joint between the handle unit 3 and the main body 2 when the handle unit 3 is coupled to the main body 2. Therefore, the structure for coupling the handle unit 3 to the main body 2 is simple and the coupling is easy.

Figure 20:
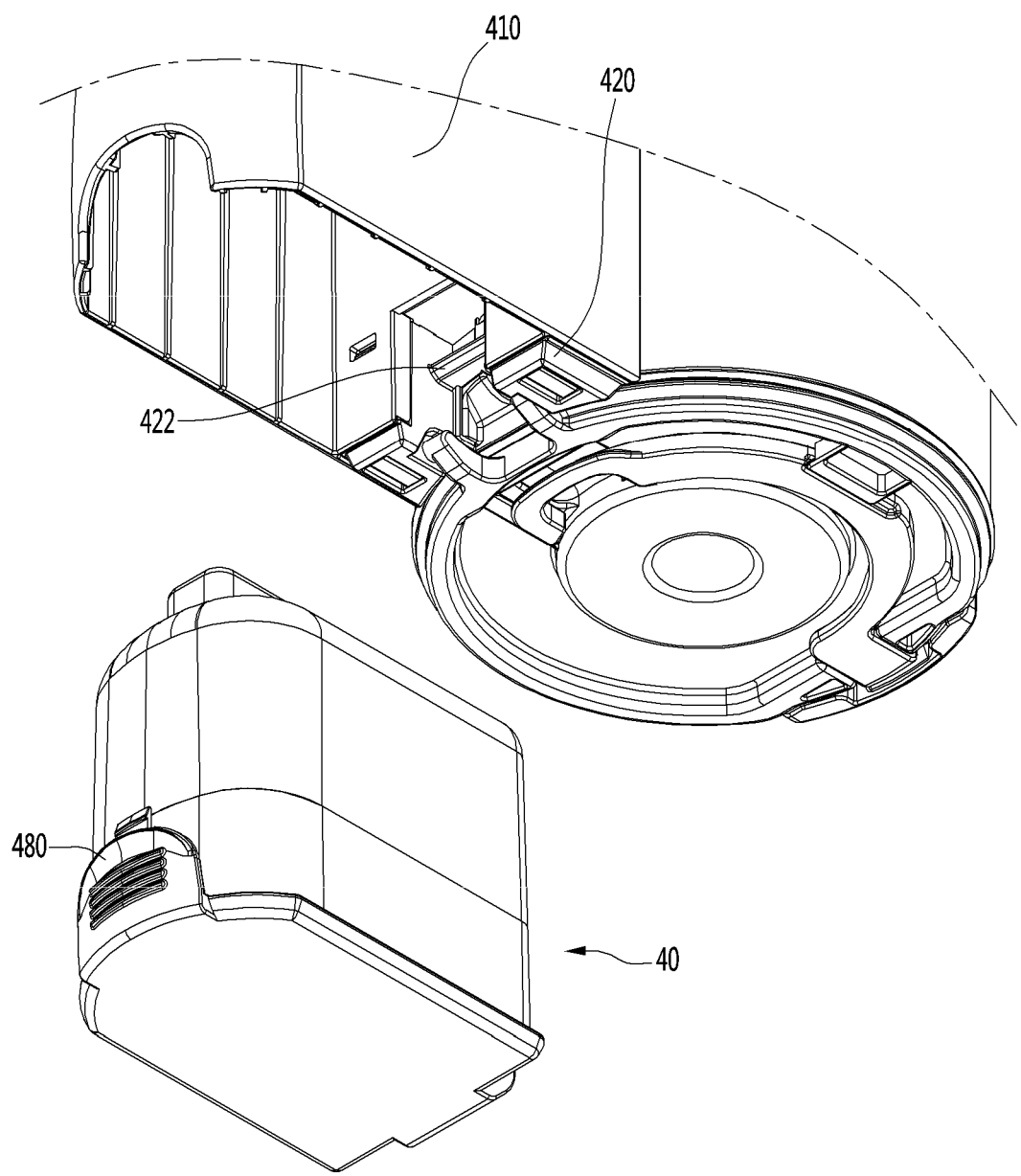
FIG. 20 is a view when a battery according to an embodiment of the present invention has been separated from a battery housing.
Figure 21:
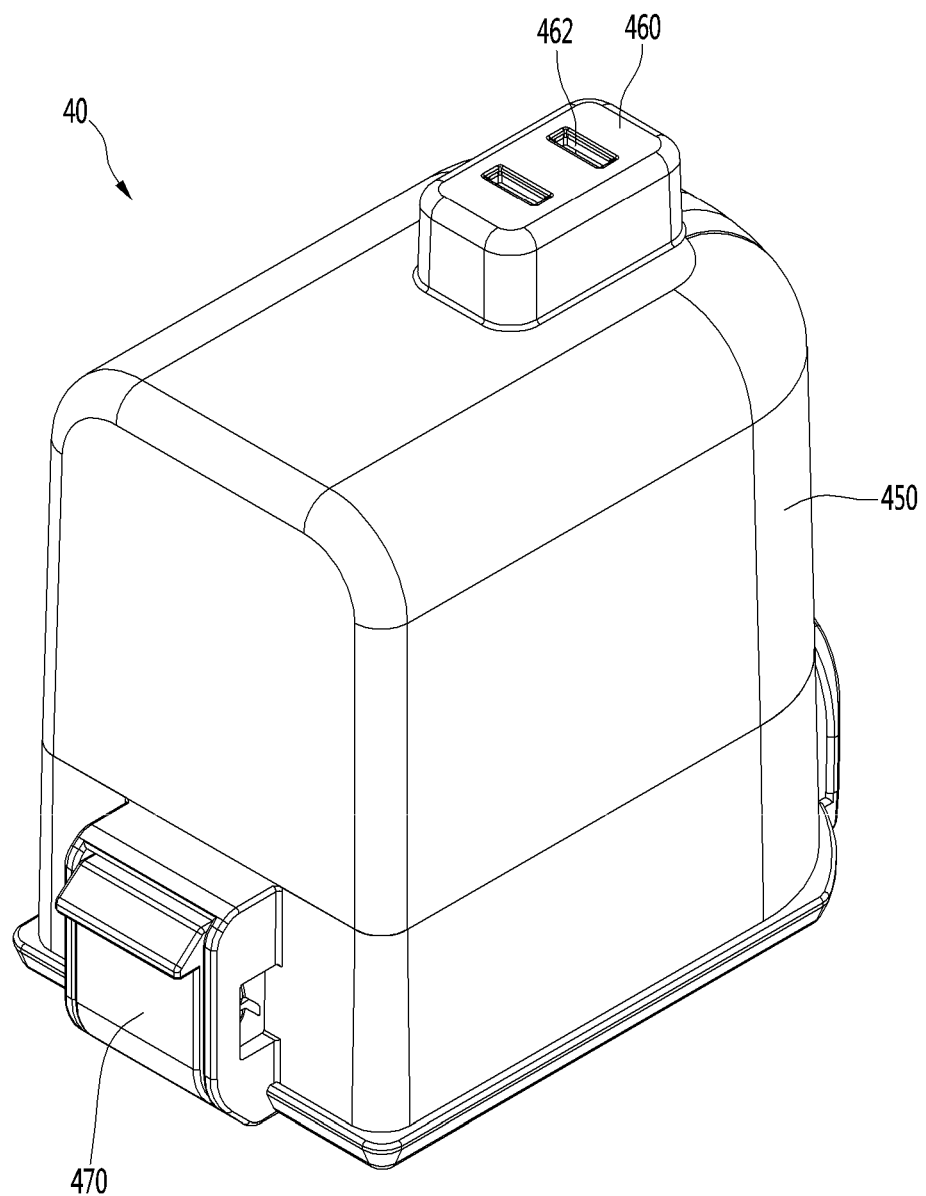
FIG. 21 is a perspective view of the battery according to an embodiment of the present invention.
Figure 22:
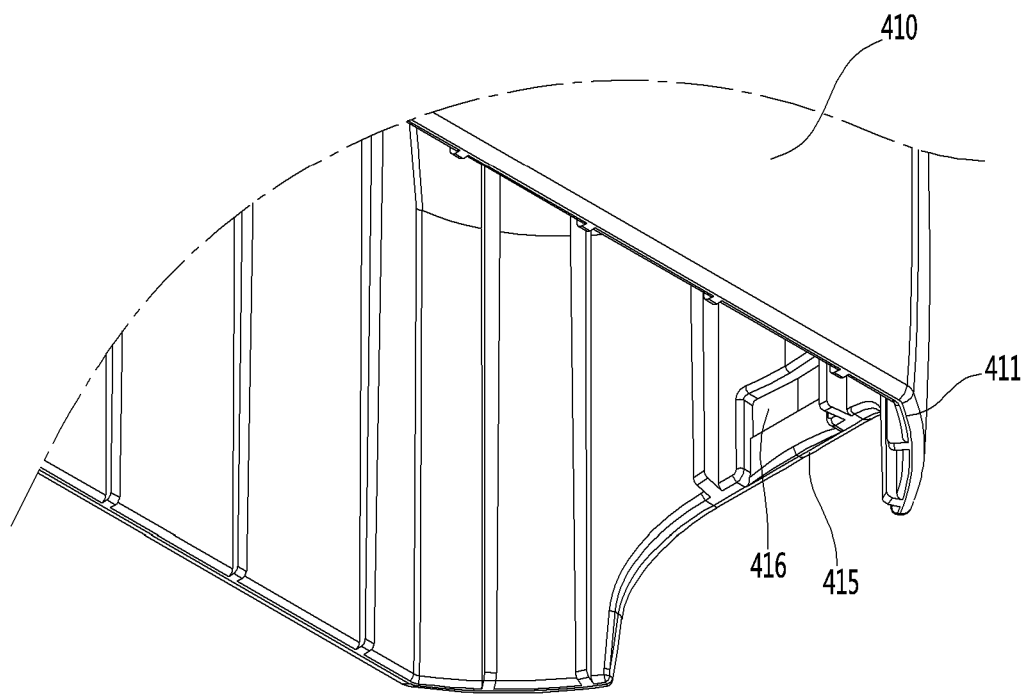
FIG. 22 is a view showing a coupling groove of a battery housing according to an embodiment of the present invention.

FIG. 20 is a view when a battery according to an embodiment of the present invention has been separated from a battery housing, FIG. 21 is a perspective view of the battery according to an embodiment of the present invention, and FIG. 22 is a view showing a coupling groove of a battery housing according to an embodiment of the present invention.

Referring to FIGS. 20 to 22, the battery 40 may include battery cells (not shown) and a frame 450 protecting the battery cells.

A protrusion 460 is formed on the top of the frame 450 and terminals 462 may be disposed in the protrusion 460.

The battery 40 may include a plurality of coupling portions 470 and 480. The coupling portions 470 and 480 may include a first coupling portion 470 disposed on a first side of the frame 450 and a second coupling portion 480 disposed on a second side of the frame 450. The first coupling portion 470 and the second coupling portion 480, for example, may be positioned opposite to each other.

The first coupling portion 470 may be a hook rotatably coupled to the frame 450.

The first coupling portion 470, for example, may be coupled to the hinge coupling portion 420 when the battery 40 is inserted in the battery housing 410. Accordingly, the hinge coupling portions 420 may be called as battery coupling portions.

A locking rib 422 for locking a portion of the hinge coupling portion 470 may be formed on the hinge coupling portion 420.

As another example, the hinge coupling portion 420 may be integrally formed with the battery housing 410 or the locking rib 422 may be formed on the battery housing 410.

The second coupling portion 480 may be a hook that is integrally formed with the frame 450 and can be deformed by external force.

An opening 411 for inserting the battery 40 is formed at the bottom of the battery housing 410. An exposing opening 415 for exposing the second coupling portion 480 to the outside may be formed so that the second coupling portion 480 can be operated with the battery 40 in the battery housing 410.

A coupling groove 416 for coupling the second coupling portion 480 may be formed over the exposing opening 415 in the battery housing 410.

A space 530 for operating the first coupling portion 470 is defined between the dust container 50 and the first coupling portion 470 when the battery 40 is inserted in the battery housing 410.

Accordingly, a user can put a finger into the space 530 and unlock the locking rib 422 from the first coupling portion 470. Further, the user can unlock the second coupling portion 480 from the battery housing 410 by operating the second coupling portion 480 exposed to the outside of the battery housing 410.

According to the present invention, since the battery 40 can be separated from the battery housing 410, it is possible to place only the battery 40 on the charging stand to charge it.

Further, since the cleaner 1 includes the main body terminal 600, it is possible to charge the battery 4 by placing the cleaner 1 on the charging stand with the battery 40 in the battery housing 410.

Figure 23:
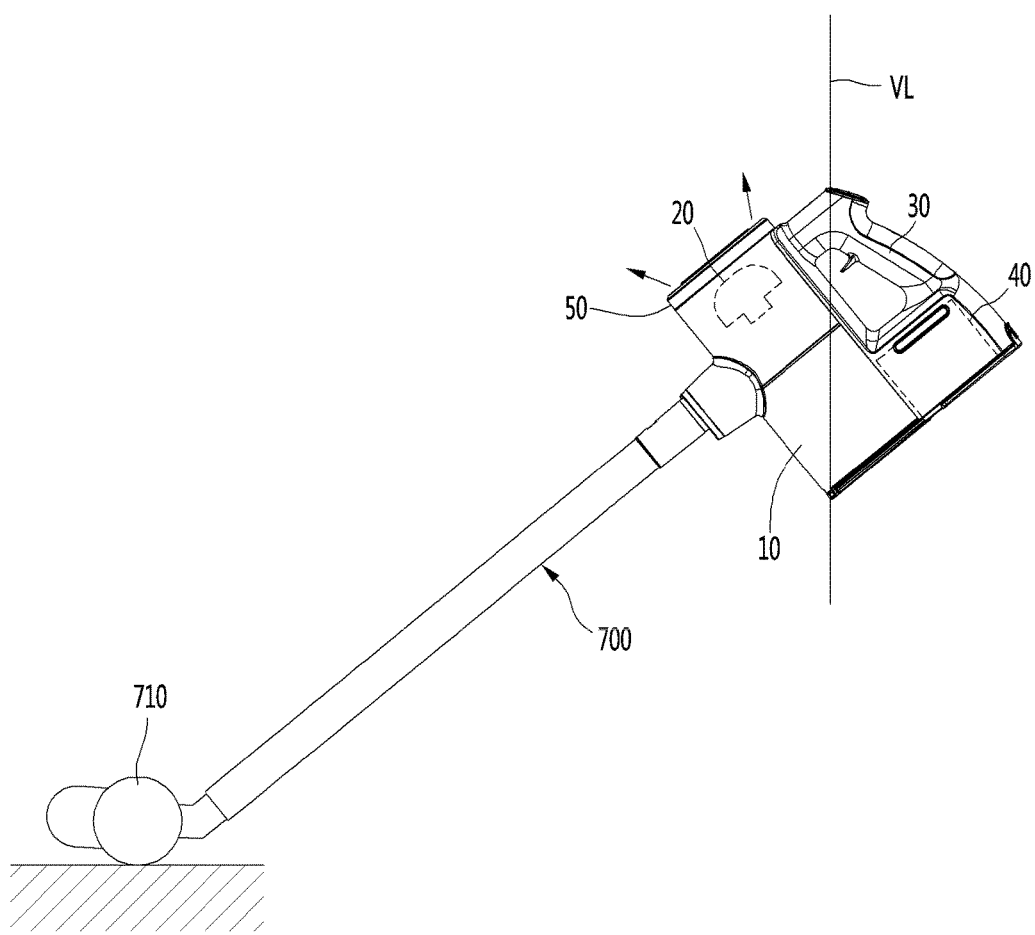
FIG. 23 is a view when the cleaner equipped with a suction unit is used to sweep a floor.

FIG. 23 is a view when the cleaner equipped with a suction nozzle is used to sweep a floor.

Referring to FIG. 23, an extension pipe 700 having a nozzle 710 extending from the lower end may be connected to the suction unit 5 of the cleaner 1 of the present invention.

In this state, a user can clean by moving the suction nozzle 710 on the floor.

When a user cleans using the suction nozzle 710 in the present invention, he/she can clean while changing the angle between the extension pipe 70 and the floor changing from about 45 degrees.

The suction motor 20 and the battery 40 may be positioned opposite to each other with a vertical line VL, which passes through the lowermost end of the first body 10, therebetween. That is, the suction motor 20 is positioned at a side from the vertical line VL (for example, ahead of the vertical line VL) and the battery 40 is positioned at the other side (for example, behind the vertical line VL). The vertical line VL may pass through the handle 30.

Further, the heights of the suction motor 20 and the battery 40 from the floor are almost the same in the state shown in FIG. 23.

Accordingly, when a user holds the handle 30 and sweeps a floor, the weight of the cleaner is balanced throughout the front and rear sides from the user's hand holding the handle, thereby maintaining weight balance. In this case, the user can clean using the cleaner 1 with small force and injuries that may be applied to the user's wrist can be prevented.

Further, in the process of sweeping the floor, as in FIG. 23, the filter unit 50 is positioned ahead of the vertical line VL and the user's hand holding the handle is positioned behind the vertical line VL. Accordingly, the air discharged through the filter unit 50 flows away from the handle 30, so it is possible to prevent the air discharged through the filter unit 50 from flowing to the user's hand.

Obviously, only a portion of the suction motor 20 may be positioned opposite to the battery 40 with the vertical line VL therebetween, depending on the angle between the extension pipe 700 and the floor. This case corresponds to cases when sweeping specific spaces such as window frames or couches.

Figure 24:
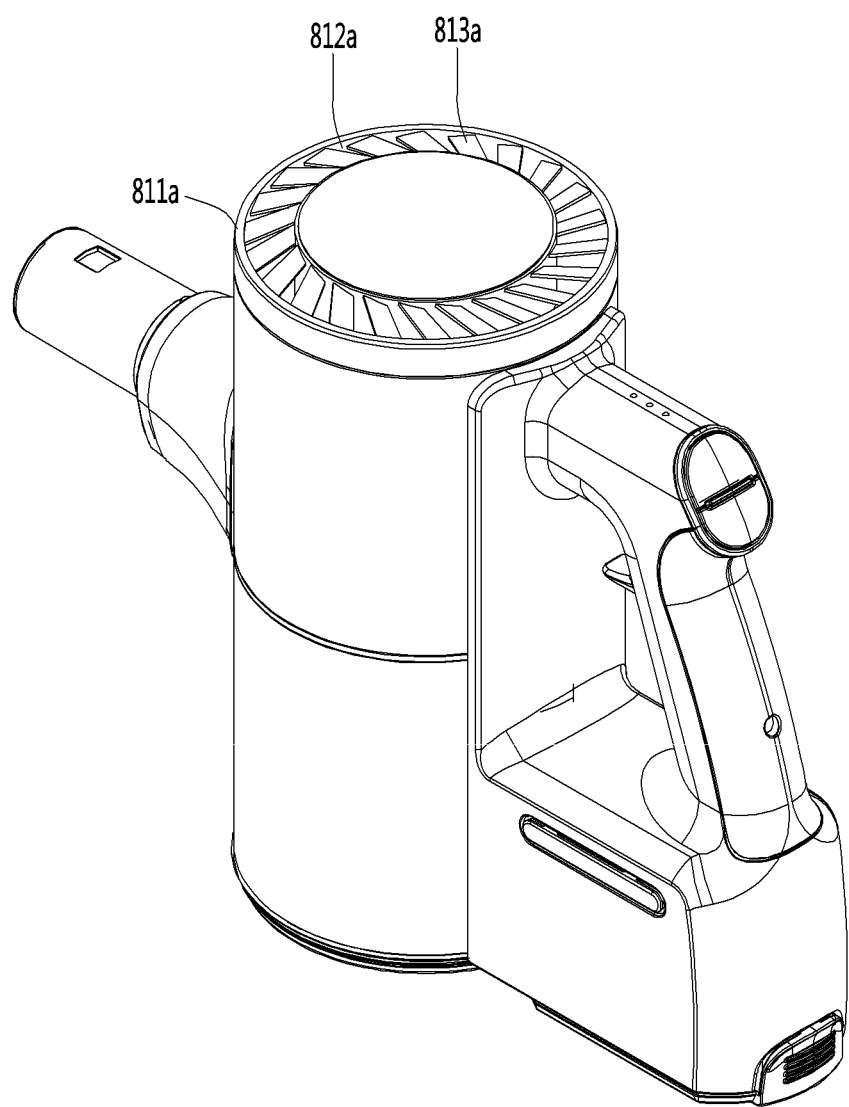
FIG. 24 is a view showing a cleaner according to another embodiment of the present invention.

FIG. 24 is a view showing a cleaner according to another embodiment of the present invention.

This embodiment is the same as the previous embodiment except for the shape of the discharge cover. Accordingly, only characteristic parts of this embodiment are described hereafter.

Referring to FIG. 24, a filter unit 811a in this embodiment may have flow guides 813a for guiding air to be discharged.

In detail, a plurality of flow guides 813 is arranged with gaps in the circumferential direction of the filter unit 811a. The spaces between the flow guides 813a function as air exits 812a.

The flow guides 813a may be inclined from a vertical line.

According to this embodiment, similarly, it is possible to prevent the air discharged from the air exits 812a from flowing to a user while the user cleans using a suction nozzle.

Further, the filter unit 811a is disposed at the top of the cleaner, so it is possible to prevent dust around the cleaner from flying due to the air discharged from the air exits 812a.

Figure 25:
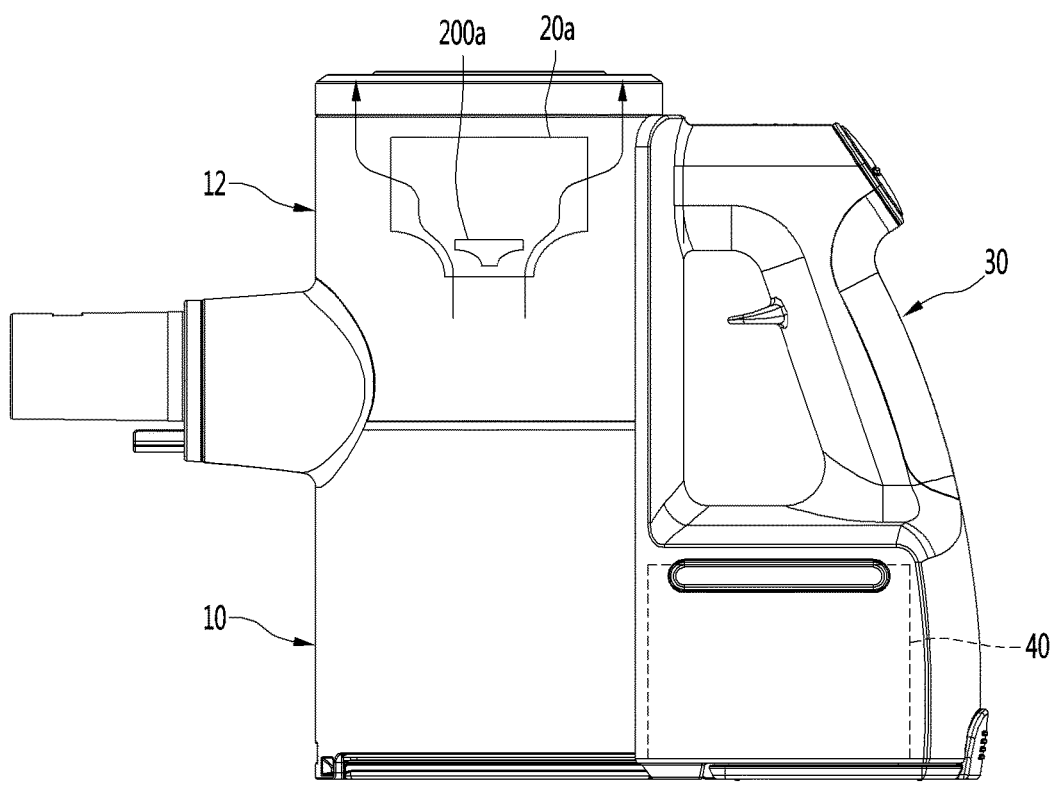
FIG. 25 is a view showing airflow in a cleaner according to another embodiment of the present invention.

FIG. 25 is a view showing airflow in a cleaner according to another embodiment of the present invention.

This embodiment is the same as the previous embodiments except for the position of the impeller in the suction motor. Accordingly, only characteristic parts of this embodiment are described hereafter.

Referring to FIG. 25, a suction motor 20a of this embodiment is disposed in a motor housing, with an impeller 200a at a lower portion therein. That is, the suction motor 20a may be positioned with an air inlet facing the second cyclone unit 130.

According to this embodiment, the air discharged from the second cyclone unit 130 directly flow upward to the impeller 200a and the air that has passed through the impeller 200a keeps flowing upward, whereby it can be discharged out of the cleaner.

According to the arrangement of the suction motor, the passage for the air that is discharged out of the cleaner from the second cyclone unit 130 is minimized, so a flow loss is minimized.

Figure 26:
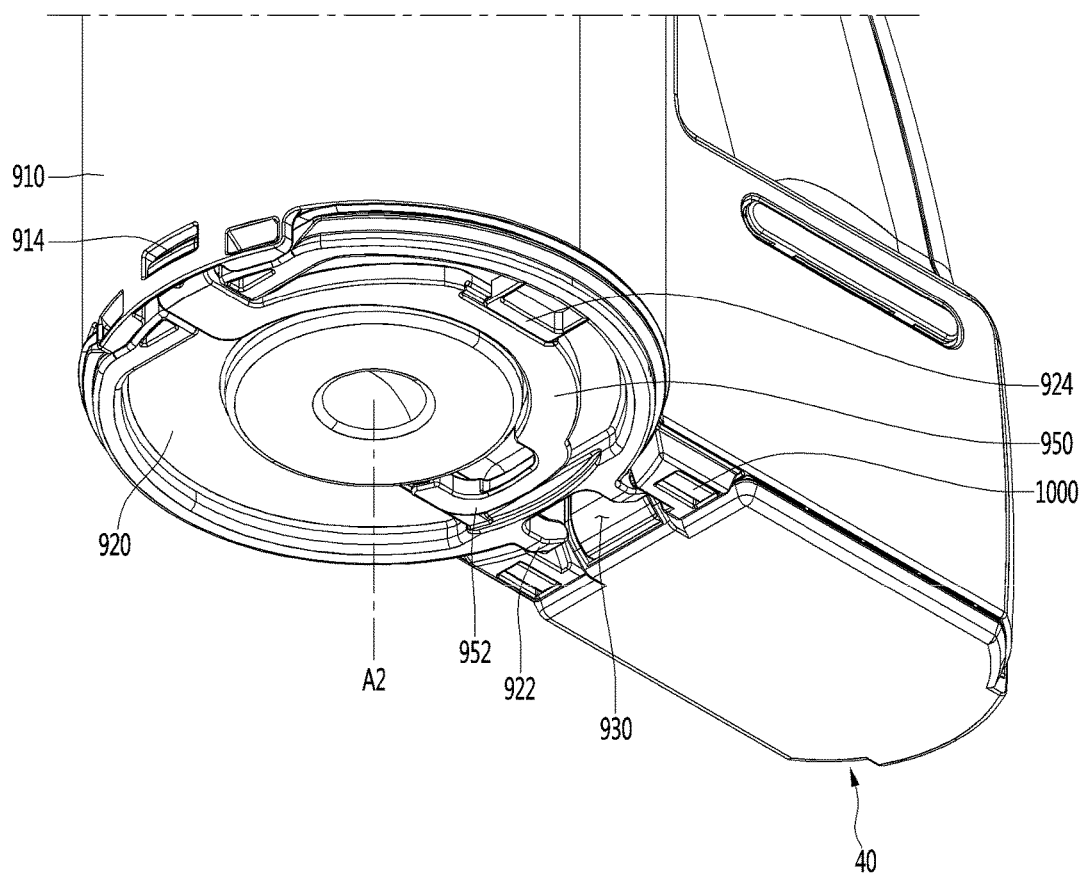
FIG. 26 is a view showing a lower structure of a cleaner according to another embodiment of the present invention.
Figure 27:
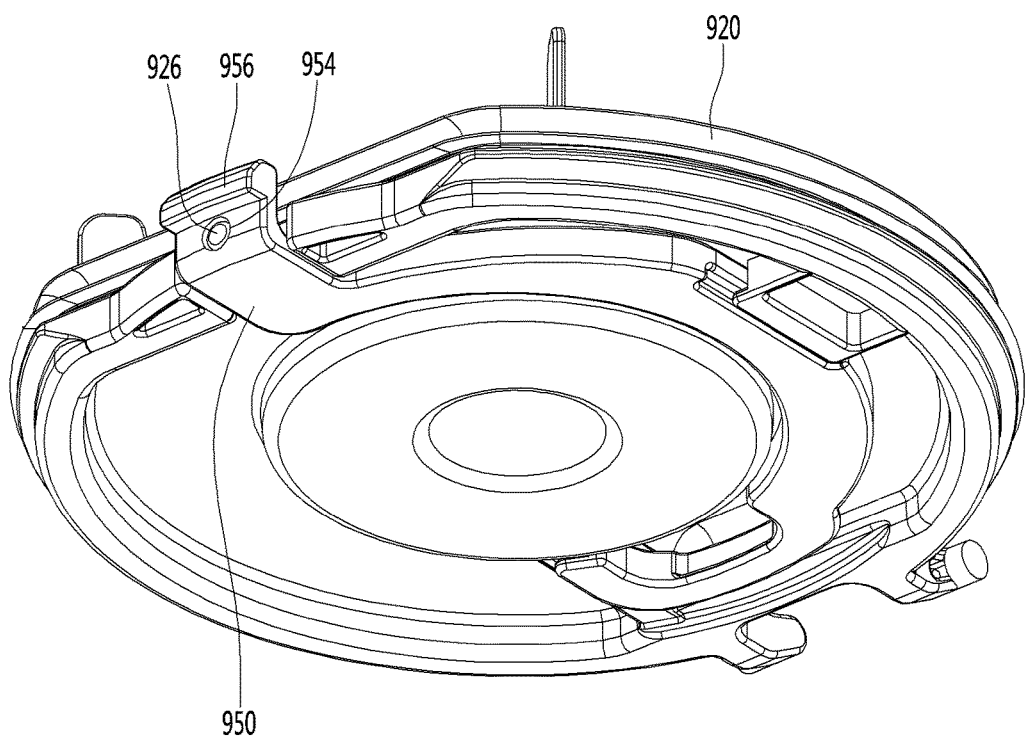
FIG. 27 is a perspective view of a body cover according to another embodiment of the present invention.
Figure 28:
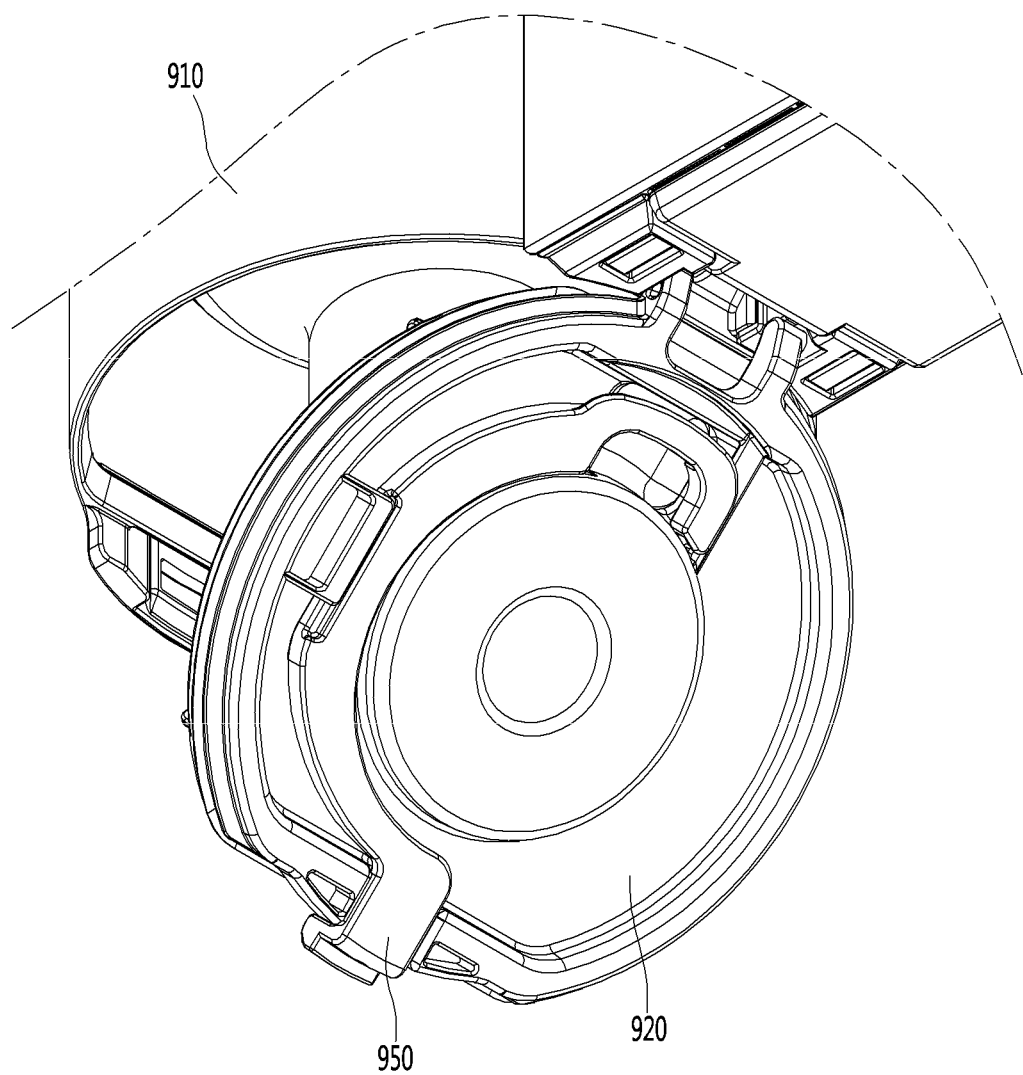
FIG. 28 is a view showing the body cover that has been turned from the state in FIG. 26.

FIG. 26 is a view showing a lower structure of the cleaner according to a further another embodiment of the present invention, FIG. 27 is a perspective view of a body cover according to a further another embodiment of the present invention, and FIG. 28 is a view showing the body cover that has been rotated from the state in FIG. 26.

Referring to FIGS. 26 to 28, the body cover 920 can open/close the bottom of a first body 910 by rotating.

The body cover 920 may include a hinge 922 for rotating. The hinge 922 may be coupled to the first body 910 or to a separate hinge coupling portion on the first body 910. When the hinge coupling portion is formed separately from the first body 910, the hinge coupling portion may be coupled to the first body 910.

The hinge 922 of the body cover 920 may be positioned between the axis A2 of the cyclonic flow and the battery 40.

Accordingly, when the body cover 920 is rotated about the hinge 922, the body cover 920 is rotated toward a user, as in FIG. 27.

After the body cover 920 is rotated toward a user, the body cover 920 prevents dust from flying to the user when the dust in the first body 910 drops.

The body cover 920 may include a coupling lever 950 that can be moved by a user and is coupled to the first body 910. The coupling lever 950 may be coupled in parallel with the longitudinal axis of the suction unit 5.

The body cover 920 may include a first guide 924 that can guide the coupling lever 950 and prevents the coupling lever 950 from separating downward. The first guide 924 extends downward from the body cover 920 and at least a portion of the first guide 924 is positioned under the coupling lever 950.

The body cover 920 may further include a second guide 926 that can guide the coupling lever 950 and prevents the coupling lever 950 from separating downward. The second guide 926 protrudes from a side of the body cover 920 and may pass through the coupling lever 950.

The second guide 926 may pass through the coupling lever 950 in parallel with the longitudinal axis of the suction unit 5. A hole 954 for the second guide 926 may be formed in the coupling lever 950.

The coupling lever 950 may have a ring-shaped portion 952 for a user to easily operate the coupling lever 950 by putting a finger in it. The ring-shaped portion 952 may be positioned between the hinge 922 of the body cover 920 and the axis A2 of the cyclonic flow so that a user can easily reach the ring-shaped portion 952.

The coupling lever 950 includes a coupling hook 956 and the first body 910 may include a hook slot 914 for locking the coupling hook 956.

The coupling hook 956 may be locked to the hook slot 914 inside the first body 510. Though not shown in the figures, an elastic member that applies elasticity to the coupling lever 950 to maintain the coupling hook 956 locked in the hook slot 914 may be disposed between the body cover 920 and the coupling lever 950.

When a user pulls the ring-shaped portion 952 of the coupling lever 950 toward himself/herself, the coupling hook 956 is pulled out of the hook slot 914, so the body cover 920 can be rotated.

On the other hand, the hinge coupling portion may include main body terminals 1000 for charging the battery 40 in the battery housing 410. It is possible to bring charging stand terminals in contact with the main body terminals 100 by placing the cleaner 1 on a charging stand (not shown).

The main body terminals 1000 are disposed on the bottom of the hinge coupling portion, but can be spaced apart from the floor when the cleaner 1 is placed on the floor. Accordingly, damage to the main body terminal 1000 can be prevented.

What is claimed is:

1. A cleaner comprising:
   a suction unit configured to guide air into the cleaner;
   a dust separation unit comprising:
      a first cyclone unit configured to separate dust from air that is suctioned into the cleaner through the suction unit; and
      a second cyclone unit configured to separate dust from air that is discharged from the first cyclone unit;
   a suction motor configured to drive a rotation of a rotary impeller via an impeller shaft to generate a suction force that suctions air into the cleaner through the suction unit;
   a motor housing that is configured to house the suction motor;
   a cleaner body that is configured to accommodate the motor housing, and that has a first opening that provides access to an interior of the cleaner;
   a pre-filter that is configured to be inserted into the cleaner body through the first opening, and that is configured to filter air that is discharged from the second cyclone unit and before the air enters the motor housing; and
   an exhaust filter unit that is configured to be coupled to the cleaner body to close the first opening of the cleaner body, and that is configured to filter air that is discharged from the suction motor, wherein in a state of being coupled to the cleaner body, the exhaust filter unit is configured to apply pressure to the pre-filter and maintain the pre-filter inserted in the cleaner body.

2. The cleaner of claim 1, wherein the exhaust filter unit is configured to apply pressure to the pre-filter and maintain the pre-filter inserted in the cleaner body to create a sealing for the pre-filter that is configured to prevent air from flowing into the motor housing without first passing through the pre-filter.

3. The cleaner of claim 1, wherein the pre-filter is configured to be removable from the cleaner body, and
   wherein the exhaust filter unit is configured to be separable from the cleaner body while maintaining the pre-filter inserted into the cleaner body.

4. The cleaner of claim 1, wherein the pre-filter has a first circular cross-sectional shape with a first axis that is parallel with the impeller shaft,
   wherein the exhaust filter unit has a second circular cross-sectional shape with a second axis that is parallel to the impeller shaft, and
   wherein, in a state in which the exhaust filter unit is coupled to the cleaner body, the second axis of the exhaust filter unit is concentric to the first axis of the pre-filter.

5. The cleaner of claim 1, wherein the suction motor is arranged between the rotary impeller and the dust separation unit.

6. The cleaner of claim 1, wherein an outer surface of the motor housing defines an air passage that guides air from the second cyclone unit into at least one opening of the motor housing.

7. The cleaner of claim 1, wherein the pre-filter is disposed circumferentially around the rotary impeller, and is configured to filter air before the air flows into the motor housing and subsequently flows through the rotary impeller.

8. The cleaner of claim 1, wherein removing the exhaust filter unit from the cleaner exposes at least part of the pre-filter to an outside of the cleaner.

9. The cleaner of claim 1, wherein the motor housing comprises a filter support that is configured to support and maintain a position of the pre-filter.

10. The cleaner of claim 1, wherein, in a state in which the cleaner is oriented with the impeller shaft arranged longitudinally along a vertical direction, the rotary impeller is disposed above the suction motor, and the suction motor is disposed above the second cyclone unit.

11. The cleaner of claim 1, wherein the first cyclone unit is configured to generate a helical flow of air that separates the dust from the air, and
    wherein an axis of the helical flow of air is arranged longitudinally along a vertical direction in a state in which the cleaner is oriented with the impeller shaft arranged longitudinally along the vertical direction.

12. The cleaner of claim 1, wherein the second cyclone unit comprises a plurality of cyclone bodies that are configured to secondarily separate dust from the air that is discharged from the first cyclone unit.

13. The cleaner of claim 1, further comprising:
    a handle that is configured to be held by a user to operate the cleaner using only one hand; and
    a battery housing that is arranged at a base of the handle and that is configured to house a removable battery for powering the cleaner.

14. The cleaner of claim 1, further comprising a dust container that is disposed under the motor in a state in which the cleaner is oriented with the impeller shaft arranged longitudinally along a vertical direction, and is configured to store dust that is separated by the dust separation unit.

15. The cleaner of claim 14, wherein the dust container has a second opening that provides access to an interior of the dust container in a second direction to release dust from the dust container, with the second direction being opposite to a first direction in which the first opening of the cleaner body provides access to the interior of the cleaner body.

16. A cleaner comprising:
a suction unit configured to guide air into the cleaner;
a dust separation unit comprising:
a first cyclone unit configured to separate dust from air that is suctioned into the cleaner through the suction unit; and
a second cyclone unit configured to separate dust from air that is discharged from the first cyclone unit;
a suction motor configured to drive a rotation of a rotary impeller via an impeller shaft to generate a suction force that suctions air into the cleaner through the suction unit;
a motor housing that is configured to house the suction motor;
a cleaner body that is configured to accommodate the motor housing, and that has a first opening that provides access to an interior of the cleaner;
a filter system that is configured to be detachably coupled to the cleaner body at the first opening of the cleaner body, the filter system comprising:
a first filter that is configured to filter air that is discharged from the second cyclone unit and before the air enters the motor housing and subsequently flows through the rotary impeller; and
a second filter that is configured to filter air that has flowed through the first filter, the rotary impeller, and the suction motor, and that is discharged from the motor housing before the air exits the cleaner body,
wherein in a state in which the filter system is coupled to the cleaner body and the cleaner is oriented with the impeller shaft arranged longitudinally along a vertical direction, the second filter is disposed above the first filter and applies pressure in a downward direction that maintains the first filter inserted in the cleaner body.

17. The cleaner of claim 16, wherein the second filter is configured to apply pressure to the first filter and maintain the first filter inserted in the cleaner body to create a sealing for the first filter that is configured to prevent air from flowing into the motor housing without first passing through the first filter.

18. The cleaner of claim 17, wherein the first filter is configured to be removable from the cleaner body, and
wherein the second filter is configured to be separable from the cleaner body while maintaining the first filter inserted into the cleaner body.

19. The cleaner of claim 16, wherein, the first filter has a first circular cross-sectional shape with a first axis that is parallel with the impeller shaft,
wherein the second filter has a second circular cross-sectional shape with a second axis that is parallel to the impeller shaft, and
is coupled to the cleaner body, the second axis of the second filter is concentric to the first axis of the first filter.

20. The cleaner of claim 16, wherein the suction motor is arranged between the rotary impeller and the dust separation unit.

21. The cleaner of claim 16, wherein an outer surface of the motor housing defines an air passage that guides air from the second cyclone unit into at least one opening of the motor housing.

22. The cleaner of claim 16, wherein the first filter is disposed circumferentially around the rotary impeller, and is configured to filter air before the air flows into the motor housing and subsequently flows through the rotary impeller.

23. The cleaner of claim 16, wherein removing the second filter from the cleaner exposes at least part of the first filter to an outside of the cleaner.

24. The cleaner of claim 16, wherein the motor housing comprises a filter support that is configured to support and maintain a position of the first filter.

25. The cleaner of claim 16, wherein, in a state in which the cleaner is oriented with the impeller shaft arranged longitudinally along the vertical direction, the rotary impeller is disposed above the suction motor, and the suction motor is disposed above the second cyclone unit.

26. The cleaner of claim 16, wherein the first cyclone unit is configured to generate a helical flow of air that separates the dust from the air, and
wherein an axis of the helical flow of air is arranged longitudinally along the vertical direction in the state in which the cleaner is oriented with the impeller shaft arranged longitudinally along the vertical direction.

27. The cleaner of claim 16, wherein the second cyclone unit comprises a plurality of cyclone bodies that are configured to secondarily separate dust from the air that is discharged from the first cyclone unit.

28. The cleaner of claim 16, further comprising:
a handle that is configured to be held by a user to operate the cleaner using only one hand; and
a battery housing that is arranged at a base of the handle and that is configured to house a removable battery for powering the cleaner.

29. The cleaner of claim 16, further comprising a dust container that is disposed under the motor in a state in which the cleaner is oriented with the impeller shaft arranged longitudinally along the vertical direction, and is configured to store dust that is separated by the dust separation unit.

30. The cleaner of claim 29, wherein the dust container has a second opening that provides access to an interior of the dust container in a second direction to release dust from the dust container, with the second direction being opposite to a first direction in which the first opening of the cleaner body provides access to the interior of the cleaner body.

* * * * *